United States Patent [19]
Dann et al.

[11] 3,934,264
[45] Jan. 20, 1976

[54] VIDEOTAPE RECORDER AND REPRODUCER EVERY LINE VELOCITY COMPENSATOR APPARATUS

[75] Inventors: Bert H. Dann, Los Altos; Barrett E. Guisinger, Saratoga, both of Calif.

[73] Assignee: International Video Corporation, Sunnyvale, Calif.

[22] Filed: Mar. 15, 1974

[21] Appl. No.: 451,491

Related U.S. Application Data

[63] Continuation-in-part of Ser. No. 439,093, Feb. 4, 1974.

[52] U.S. Cl. .................................................. 358/8
[51] Int. Cl.² ........................................ H04N 5/76
[58] Field of Search ........................................ 358/8

[56] References Cited
UNITED STATES PATENTS

| | | | |
|---|---|---|---|
| 3,504,111 | 3/1970 | Sumida et al. | 358/8 |
| 3,592,961 | 7/1971 | Grace | 358/8 |

Primary Examiner—Richard Murray
Attorney, Agent, or Firm—Limbach, Limbach & Sutton

[57] ABSTRACT

A velocity error compensator for a multiple video head VTR in which velocity error compensation is provided for all the lines adjacent a head switch. Separate velocity error detectors are provided in auxiliary channels continuously connected to each respective video head. By providing a mechanical overlap of video heads on the tape velocity error signals are developed for all the lines adjacent a head switch. Depending on the type of velocity error detection employed, the mechanical overlap must be sufficient to provide either simultaneous horizontal sync pulses or both horizontal sync pulses and color bursts from the adjacent heads. Suitable switching is provided to continuously apply the correct velocity error signal to the main channel video signal which is to be corrected. The arrangement avoids banding that develops in multi-generation copies where a line adjacent a head switch is not velocity corrected.

10 Claims, 74 Drawing Figures

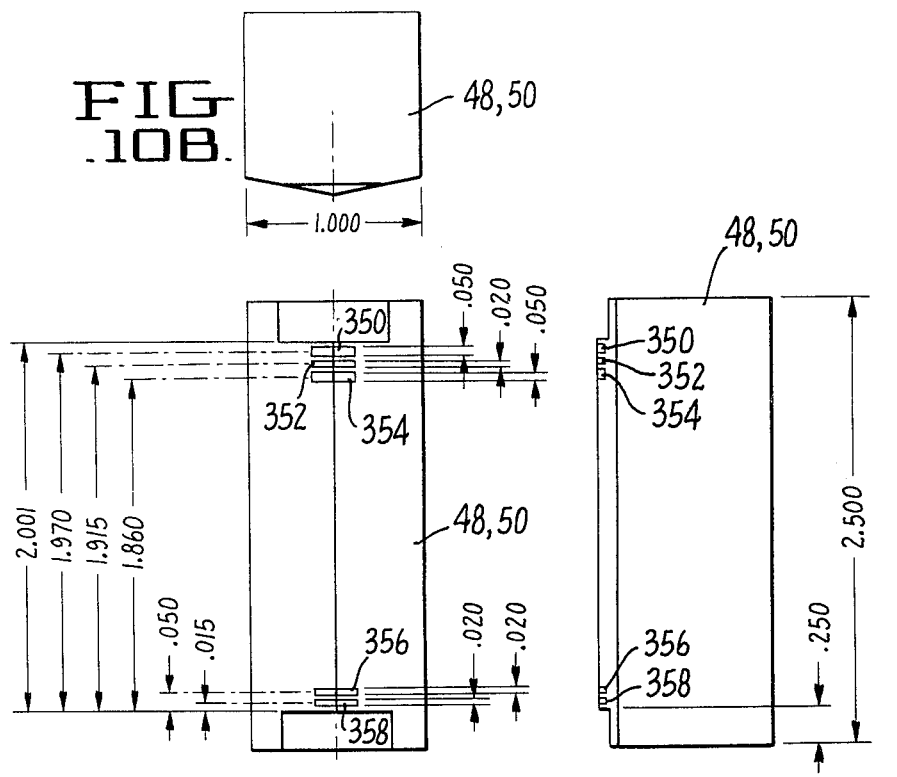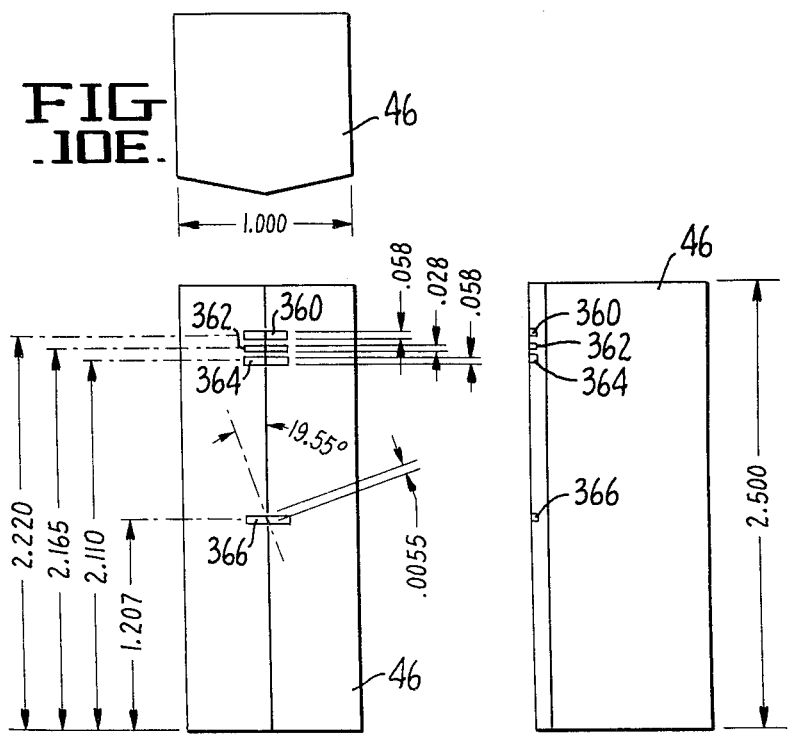

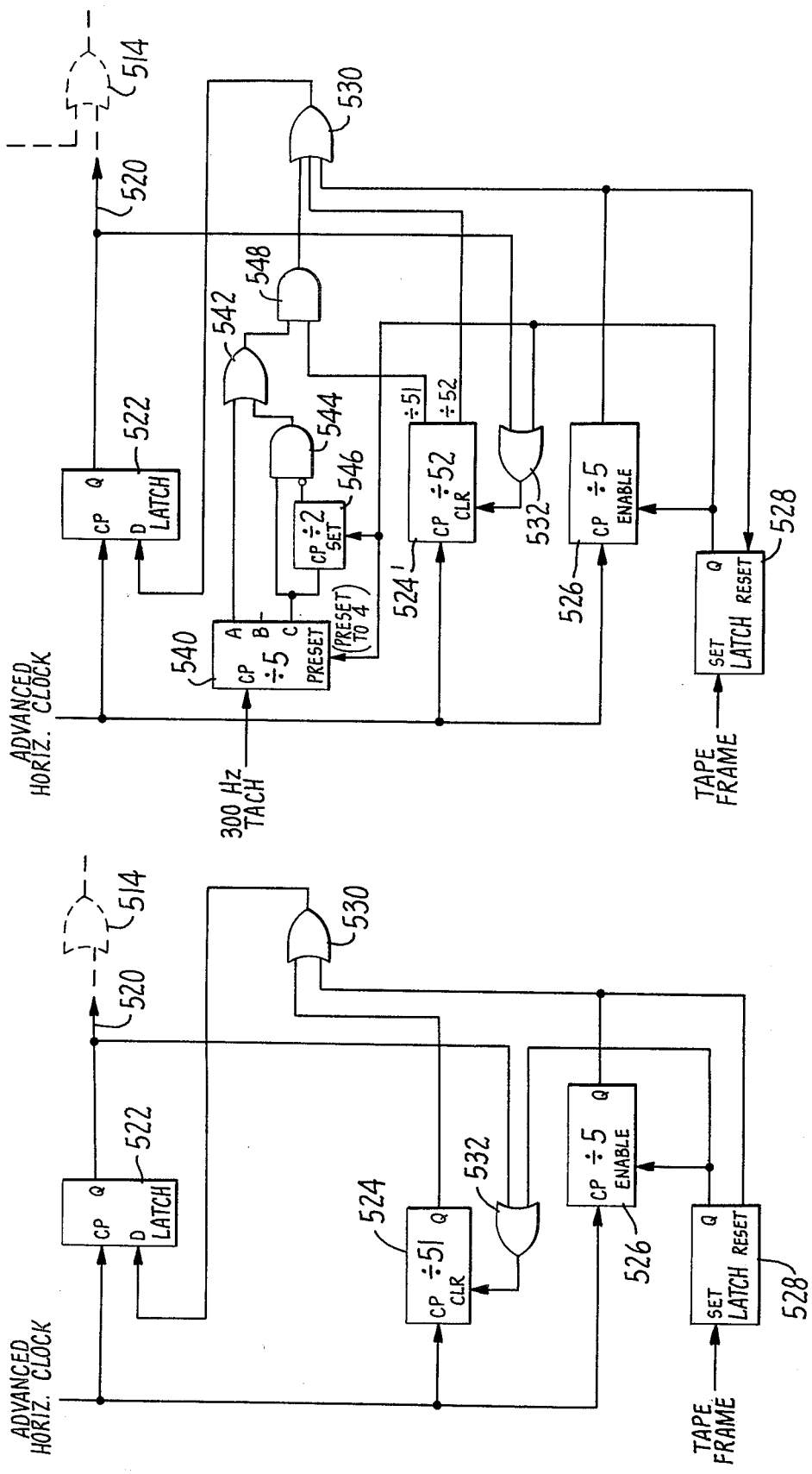

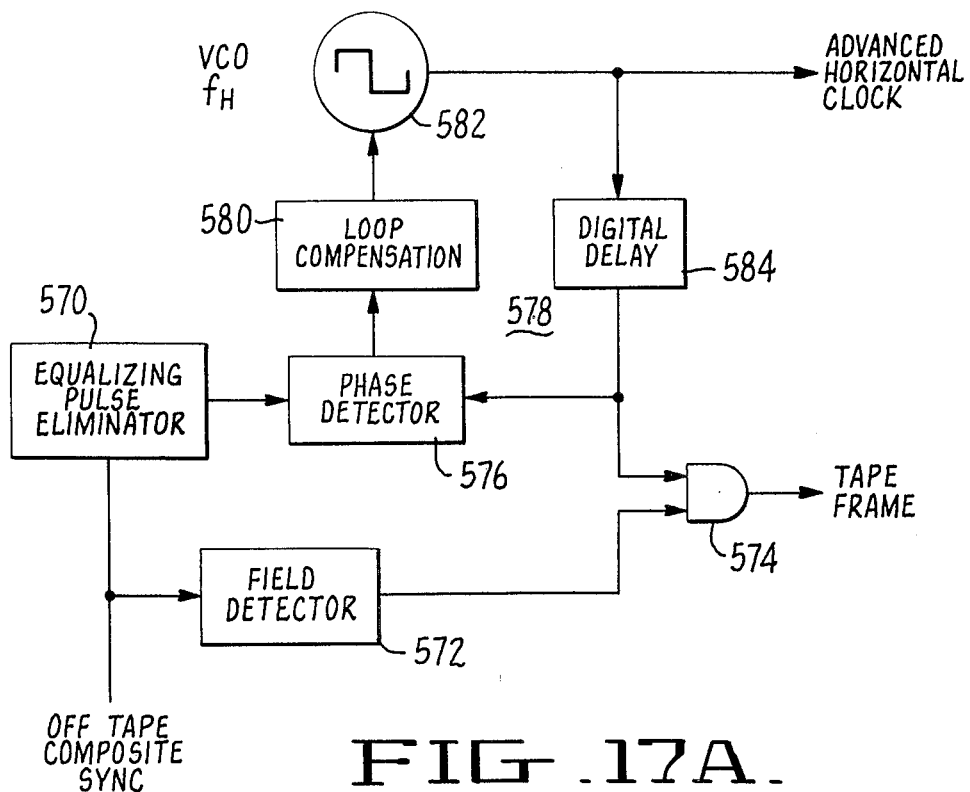
FIG. 17A.
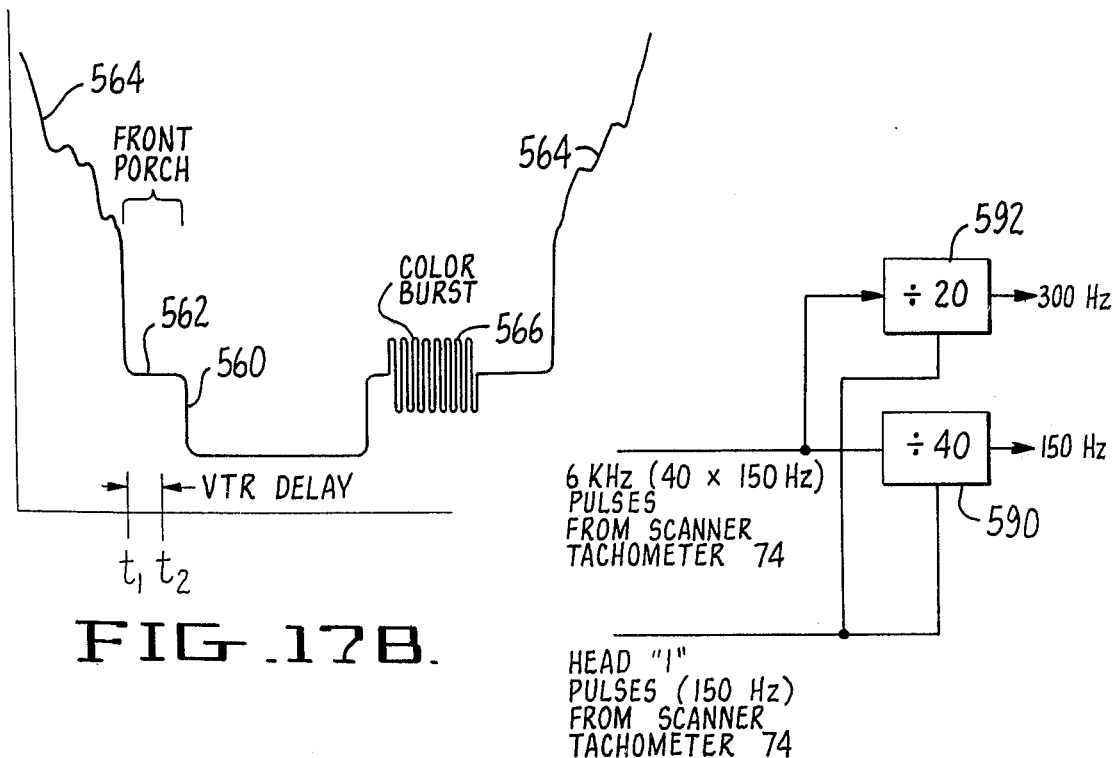
FIG. 17B.
FIG. 17C.

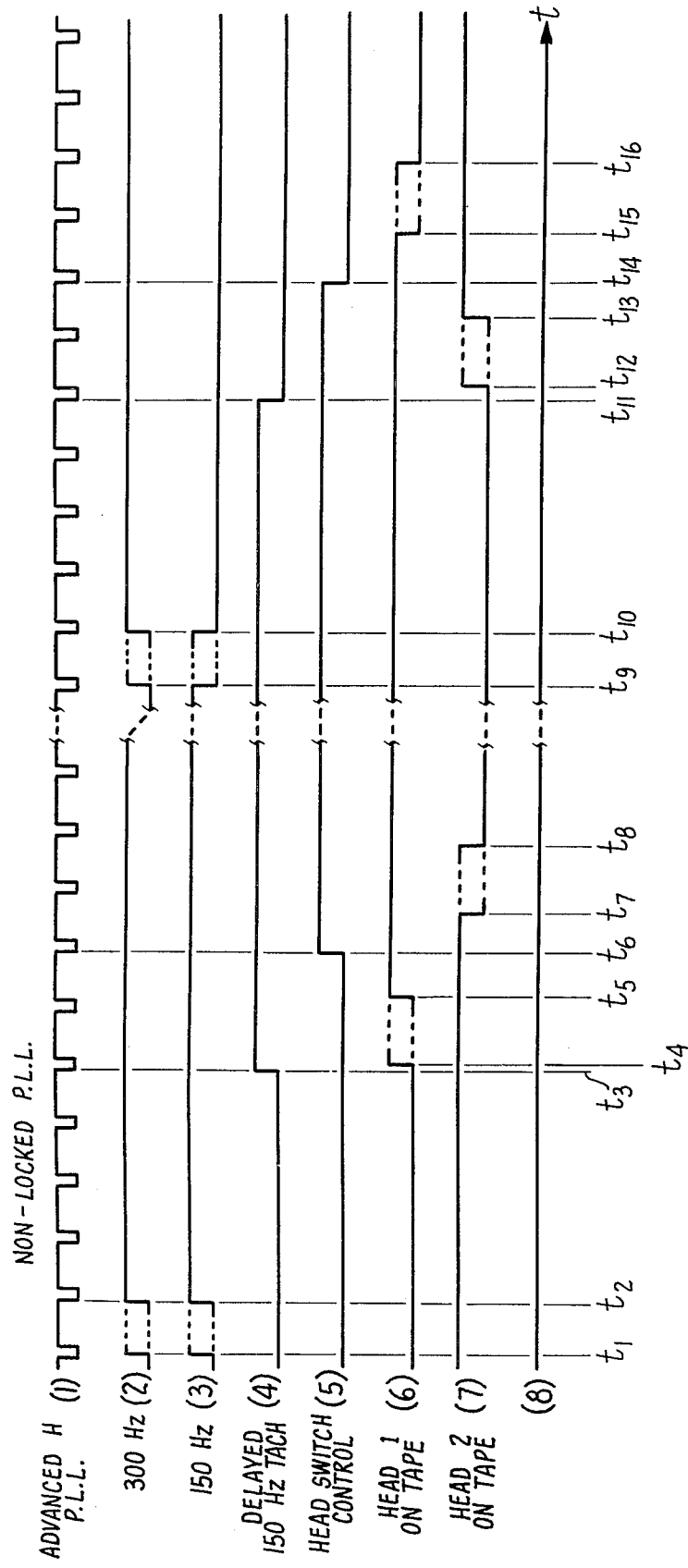

FIG. 28.
- A BURST ENVELOPE
- B ARM

FIG. 29
- A ARM
- B BURST CYCLE
- C 40 NS. PULSE
- D DELAYED BURST
- E SAMPLE PULSE
- F RESET DEFEAT
- G RAMP SAMPLE
- H SET $t_{m-1}$
- I SET $t_m$
- J SET $t_{m+1}$

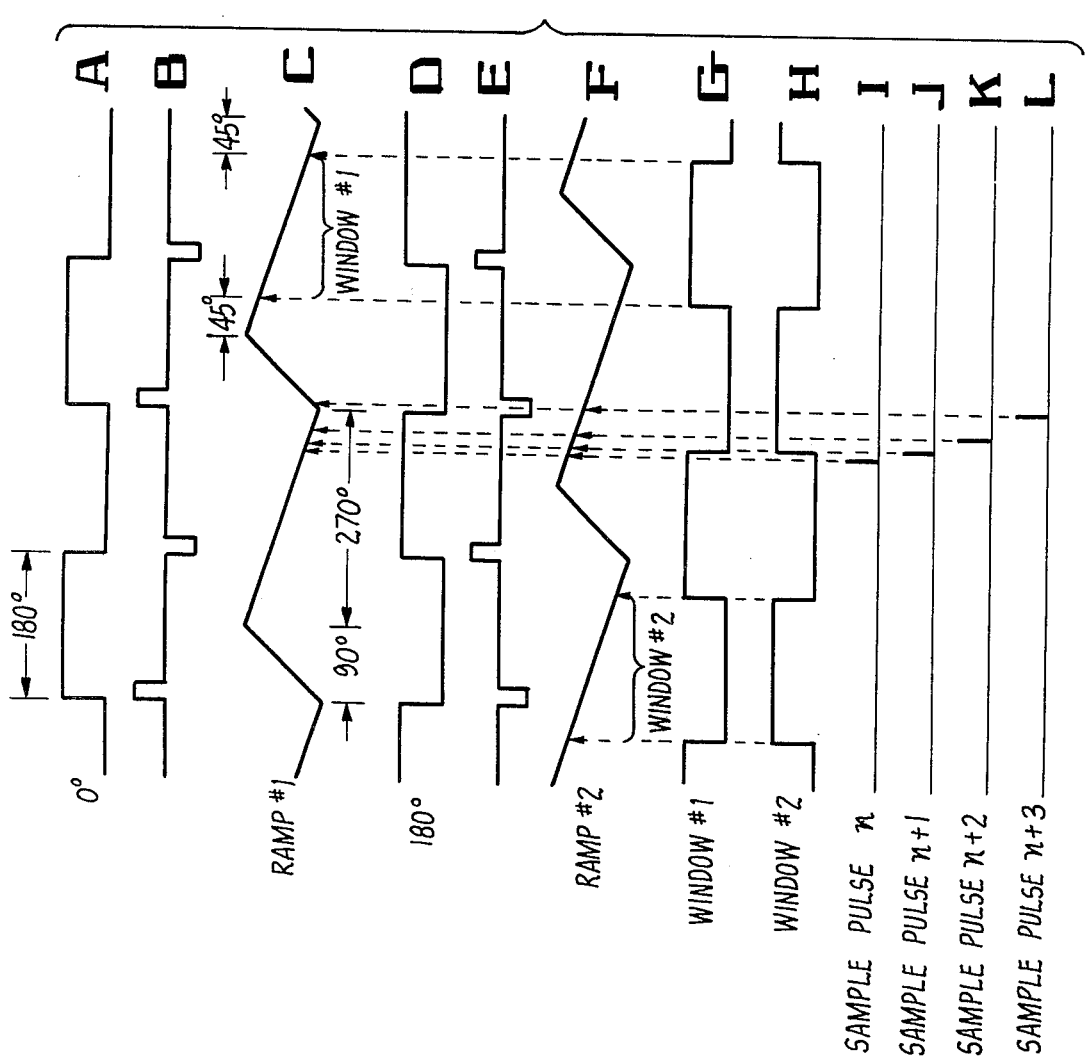

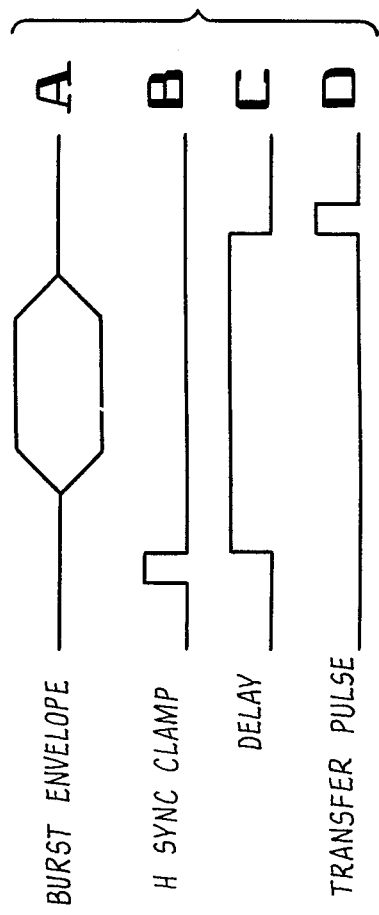
FIG._31_
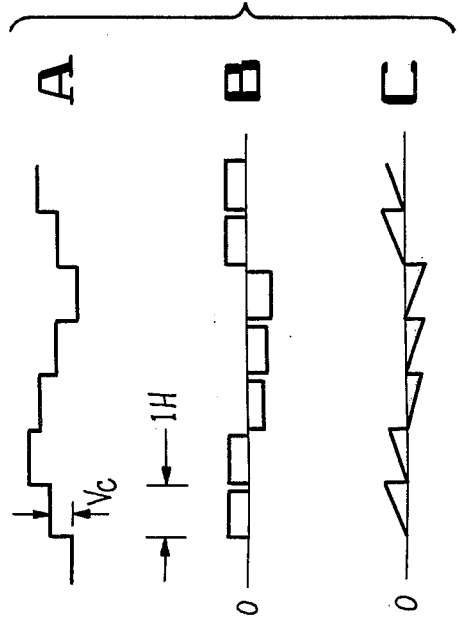
FIG._32_

VIDEOTAPE RECORDER AND REPRODUCER EVERY LINE VELOCITY COMPENSATOR APPARATUS

This is a continuation-in-part of our copending application Ser. No. 439,093, filed Feb. 4, 1974, entitled, VIDEO TAPE RECORDER AND REPRODUCER VELOCITY COMPENSATOR APPARATUS.

BACKGROUND OF THE INVENTION

This invention relates to videotape recorder and playback devices (VTR's) and, more particularly, to apparatus for correcting the so-called "velocity" error component of a television signal played back on a VTR on a continuous, every line basis. Heretofore in multiple head VTR's wherein each video track is a portion of a field (known as "segmented" scan VTR's), no complete velocity compensation corrections were made to the television line adjacent a head switch.

The present invention is one portion of a VTR, portions of which are disclosed in other copending applications assigned to the present assignee, all of which are incorporated herewith by reference:

| Ser. No. | Title | Filed | Inventor(s) |
|---|---|---|---|
| 285,919 | SYNCHRONIZING PULSE PROCESSOR FOR A VIDEO TAPE RECORDER | 9-1-72 | Bert H. Dann and Nikola Vidovic |
| 285,922 | HELICAL SCAN WIDEBAND TAPE RECORDER APPARATUS AND METHOD | 9-1-72 | Barrett E. Guisinger |
| 285,924 | FM PULSE AVERAGING DEMODULATOR | 9-1-72 | Bert H. Dann |
| 285,917 | VIDEO TAPE RECORDER METHOD AND APPARATUS | 9-1-72 | Kenneth Louth |
| 314,734 | TECHNIQUE FOR DETECTING LONG DURATION PULSES FROM A TRAIN OF SHORT DURATION PULSES | 12-13-72 | Nikola Vidovic |
| 320,092 | PASSIVE PEAK DETECTOR AND LEVEL SHIFTER | 1-2-73 | Nikola Vidovic |
| 354,227 | MAGNETIC TAPE TRANSPORT SYSTEM | 4-25-73 | Frank S.C. Mo and Vernon Natwick |
| 355,220 | VIDEOTAPE RECORDER AND REPRODUCER VELOCITY COMPENSATOR APPARATUS | 4-27-73 | Barrett E. Guisinger and Bert H. Dann |
| 355,758 | VIDEO PROCESSING CIRCUIT | 4-30-73 | Nikola Vidovic |
| 355,781 | PHASE SHIFTER APPARATUS | 4-30-73 | Nikola Vidovic |
| 356,380 | VIDEO TAPE RECORDER METHOD AND APPARATUS | 5-2-73 | Kenneth Louth |
| 356,839 | VIDEO TAPE RECORDER EDITING APPARATUS | 5-3-73 | Bert H. Dann |
| 439,093 | VIDEOTAPE RECORDER AND REPRODUCER VELOCITY COMPENSATOR APPARATUS | 2-4-74 | Bert H. Dann and Barrett E. Guisinger |

In the videotape recorder (VTR) art the requirements of broadcast quality color television signal recording and reproduction has placed extremely stringent tolerances on the time base stability of the VTR. Modern color VTR's intended for broadcast use include several sub-systems which contribute to a relatively stable reproduced television signal: capstan and head drum servo systems for resolving large phase errors between the VTR signal and a reference signal and electronic circuits for resolving the smaller remaining phase errors left uncorrected by the servo systems.

Typical VTR's employ two controllable variable delay lines in series: the first, a portion of a sub-system generally referred to as the monochrome time base corrector, is controlled by an error signal derived by comparing the phase of off-tape horizontal sync signals to reference horizontal sync signals; the second, a portion of a sub-system generally referred to as the chrominance (or color) time base corrector, provides a vernier correction and is controlled by a phase comparison between the off-tape chrominance sub-carrier (color burst) and the reference chrominance sub-carrier.

The effect of the monochrome and chrominance time base correctors is to produce a phase change in the VTR off-tape television signal so as to bring it in "precise" phase coincidence (within several nanoseconds) with the reference sync and burst signals. The phase corrections are made to the VTR off-tape television signal at the start of each horizontal line and the same correction is maintained by the time base correctors throughout the line.

It was discovered, however, that the correcting of the VTR off-tape signal at each horizontal line is not adequate. Although the VTR signal is in phase with the reference at the start of a line, the VTR off-tape signal phase departs from the reference phase through the horizontal line time so that by the end of the horizontal line there is an unacceptable phase error. Fortunately, the progressive phase error through the horizontal line is essentially linear. Thus, a further time base error correction is provided, known as "velocity" compensation, so named because it was believed to result from variations in head drum velocity due to mechanical offsets, etc. It appears that the so-called "velocity" error may also be a result of waves set up in the tape when struck by the rapidly moving video heads. Nevertheless, the exact cause of "velocity" error is of no importance to the present invention.

Because the "velocity" error is essentially a straight line error, the standard solution is to add a ramp having the proper slope to the voltage in the color time base corrector which controls the vernier delay time. Thus, the delay line is changed progressively throughout each horizontal line and the last significant phase error is compensated. Discussions of time base correction in VTR's is found in *Magnetic Recording* by Charles E. Lowman, McGraw-Hill, 1972; "A Short History of Television Recording: Part II" by Albert Abramson, *Journal of the SMPTE*, March, 1973, pp. 188–198; "A New Technique for Time-Base Stabilization of Video Recorders" by Charles H. Coleman, *IEEE Transactions on Broadcasting*, March, 1971, pp 29–36; U.S. Pat. Nos. 3,213,192 (Jensen), 3,428,745 (Coleman et al.); and 3,504,111 (Sumida et al.).

Prior art velocity compensators are classifiable into two groups: storage systems where the corrections are not made to the actual line in which the velocity error is measured and oneline delay systems in which the corrections are made to the actual line in which the error is measured. Both approaches suffer from the problem that no full correction is made for one line adjacent a head switch. In the type disclosed in the Coleman et al. U.S. Pat. No. 3,428,745 the VTR off-tape horizontal sync pulses are compared to reference horizontal sync pulses and the phase error between consecutive horizontal lines is stored for one head wheel rotation period. This approach assumes that the same or nearly the same velocity error occurs when the head wheel subsequently rotates to the same position. Storage means are required for the number of horizontal lines covered by a head wheel rotation (64 in the case of the "quadruplex" recorder). In such a system, the line following a head switch is not fully corrected.

In another type of velocity compensator as disclosed in the Coleman *IEEE Transactions* article and the Sumida et al. U.S. Pat. No. 3,504,111, a one horizontal line delay is placed in the VTR off-tape signal path and the phase of the color burst (chrominance subcarrier) before and after the delay is compared. This approach has the advantage of avoiding storage of the error measurements since the correction may be immediately applied to the one line delayed signal. In such a system, the line before a head switch is not fully corrected.

In the aforementioned prior art systems, the line before or after a head switch is uncorrected because the corrections are based on line-to-line comparisons from the same video head. Typically, the same correction is stored and used as for the previous or subsequent line. While providing a reasonably close correction, nevertheless, such errors are not fully corrected and become visible when multi-generation copies are made.

In accordance with the teachings of the present invention, every line velocity error correction is achieved by providing a mechanical overlap on the played back video tape so that two adjacent video heads simultaneously reproduce at least one clean horizontal sync pulse or horizontal sync pulse and color burst. In addition to the normal high quality main video processing channel which is switched among the heads in sequence, auxiliary low quality channels are continuously connected to each video head and velocity error detection circuitry operates in connection with the low quality channels. The low quality channels need only provide a reasonably noise-free color burst, or sync edges if used instead of the color burst, for the velocity error detection. The same head switching sequence, properly delayed, can be used to select the proper low quality channel. Due to the overlap, the line adjacent the head switch has the correct velocity error based on information not available in the main video channel. Although for the purposes of a complete disclosure the invention is described in connection with a video tape recorder as described in said U.S. Ser. No. 285,922 application and in connection with the velocity error detector of said U.S. Ser. No. 439,093 application, it is to be understood that the invention applies to all types of helical scan and quadruplex VTR's using multiple heads, and further, that the invention applies to all types of velocity error detection techniques other than that of said U.S. Ser. No. 439,093 application. For example, velocity error detectors using horizontal sync as references. Nor is the invention limited to one-line delay systems. It may be used with the aforementioned storage type system.

These and other advantages of the present invention will be better understood as this specification and drawings are read and understood.

BRIEF DESCRIPTION OF THE DRAWINGS

FIGS. 10A – 10C show front elevation, top plan and side elevation views, respectively, of the record/play head stack and monitor head stack.

FIGS. 10D – 10F show front elevation, top plan and side elevation views, respectively, of the erase head stack.

FIG. 14B is a waveform useful in understanding FIG. 14A.

FIG. 14C is a waveform useful in understanding FIG. 14A.

FIG. 15 is a block diagram of the PAL/SECAM logic segmenting circuit.

FIG. 16 is a block diagram of the NTSC logic segmenting circuit.

FIG. 17A is a block diagram of a circuit for providing advanced off-tape horizontal clock pulses and tape frame pulses.

FIG. 17B is a portion of a composite television waveform centered around a horizontal sync pulse showing the desired head switching time.

FIG. 17C is a block diagram showing the sources of the 300 Hertz and 150 Hertz signals used in the circuits of FIGS. 14, 15 and 16.

FIGS. 18A – 18C show various timing waveforms related to the video head switching sequences and the operation of the circuits of FIGS. 14 and 15.

FIG. 28 CA-B) is a series of waveforms useful in understanding the zero crossing selector of FIG. 25.

FIG. 29 (A-D) is a further series of waveforms useful in understanding the zero crossing selector of FIG. 25.

FIG. 30 (A-L) is a series of waveforms useful in understanding the ramp generator of FIG. 26.

FIG. 31 (A-D) is a series of waveforms useful in understanding the sample switch, clamps and error transfer switch of FIG. 27.

FIG. 32(A-C) is a series of waveforms further useful in understanding the sample switch, clamps and error transfer switch of FIG. 27 and also the overall system of FIG. 22.

DESCRIPTION OF THE PREFERRED EMBODIMENTS

Figure 1:
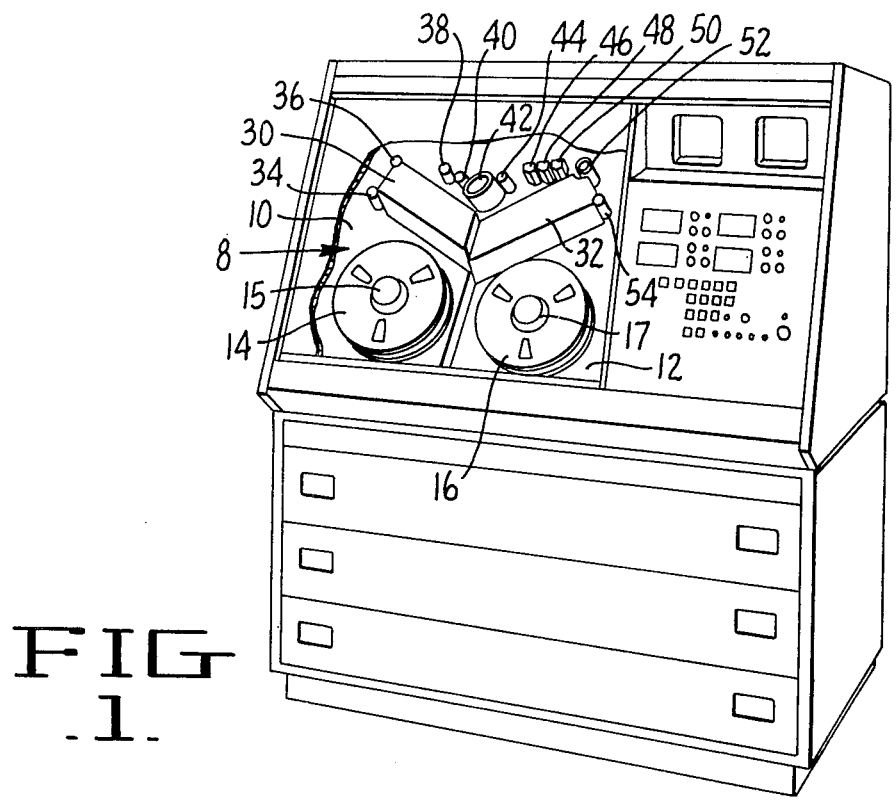
FIG. 1 is a perspective view of a videotape recorder and playback console suitable for embodying the every line velocity compensator apparatus according to the present invention.
Figure 2:
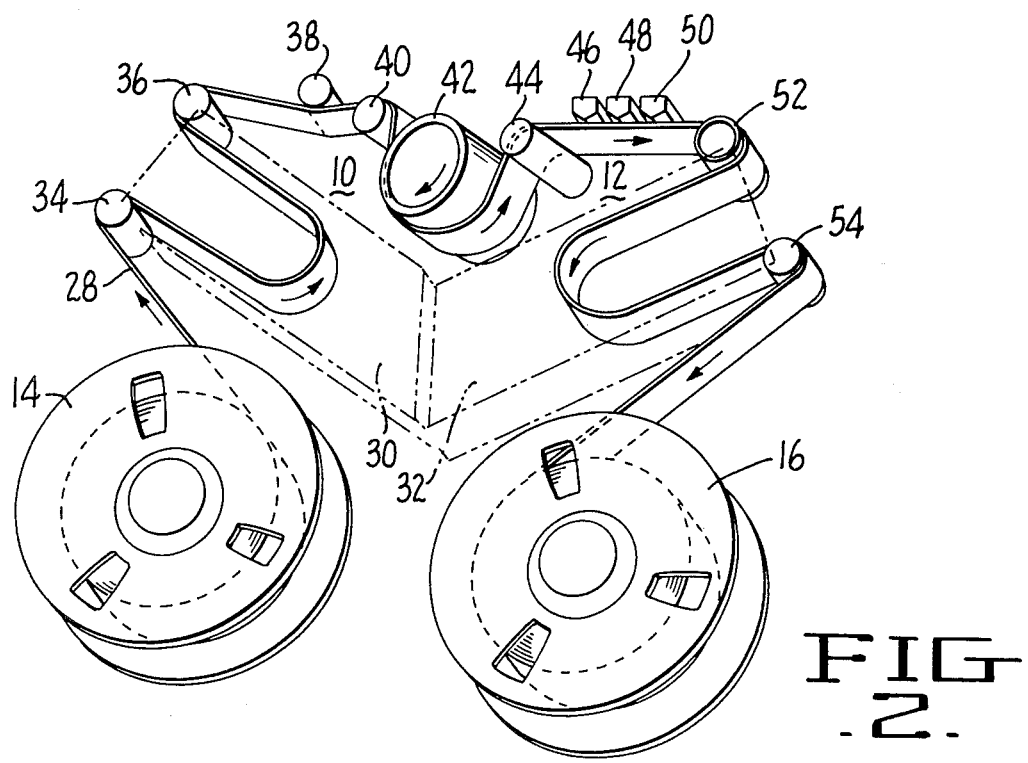
FIG. 2 is a perspective view of a portion of the videotape recorder deck or transport assembly shown in FIG. 1.

Referring now to FIGS. 1 and 2, perspective views of a video tape recorder deck or transport assembly 8 suitable for practicing the present invention are shown. The assembly includes an upper deck plate portion 10 and a lower deck plate portion 12: due to the nature of the helical scan wrap around scanner assembly 42, the supply and take up portions of the deck assembly 8 are displaced in height. A supply reel 14 is held by a hub 15 fixed to the upper deck plate 10. Video tape 28 from supply reel 14 passes around an air bearing guide pose 34 and loops into a first vacuum column 30. Tape 28 comes out of vacuum column 30 around a further air bearing guide post 36 to a scanner assembly air bearing guide post 40. A full tape width bulk erase head 38 is located between posts 36 and 40 so as to contact the tape 28. The scanner assembly 42, described in further detail below, along with the input and output air bearing guide posts 40 and 44 form an angle of about 19.55° with the plane of deck plates 10 and 12 in order to provide the desired video track angle of about 19.55°.

Tape 28, guided by posts 40 and 44 forms a wrap of about 188.57° around the scanner assembly 42. An air bearing is also provided around the scanner assembly 42. A vacuum collar (not shown) separates the tape 28 from the scanner assembly 42 when the tape is stopped. After passing around post 44, the tape 28 contacts three record/playback head stacks 46, 48 and 50 as described further in connection with FIGS. 9A, 9B and 9C. Head stacks 46, 48 and 50 carry various audio, audio cue, address code, video confidence and erase heads.

Tape 28 then passes around capstan 52, loops into a second vacuum column 32, and passes around a further air bearing guide post 54 to take up reel 16 held by hub 17 on the lower deck plate 12. Vacuum columns 30 and 32 cooperate in tandem to provide a variable vacuum pull on each side of the scanner assembly 42, thus permitting a variable tape tension. The entire tape path has very low friction due to the use of air bearing members and the use of vacuum columns for tension control. Further details of the deck assembly including the vacuum columns 30, 32, vacuum collar (not shown) and the scanner assembly 42 are disclosed in said copending application of Frank S. C. Mo and Vernon R. Natwick U.S. Ser. No. 354,227.

Figure 3:
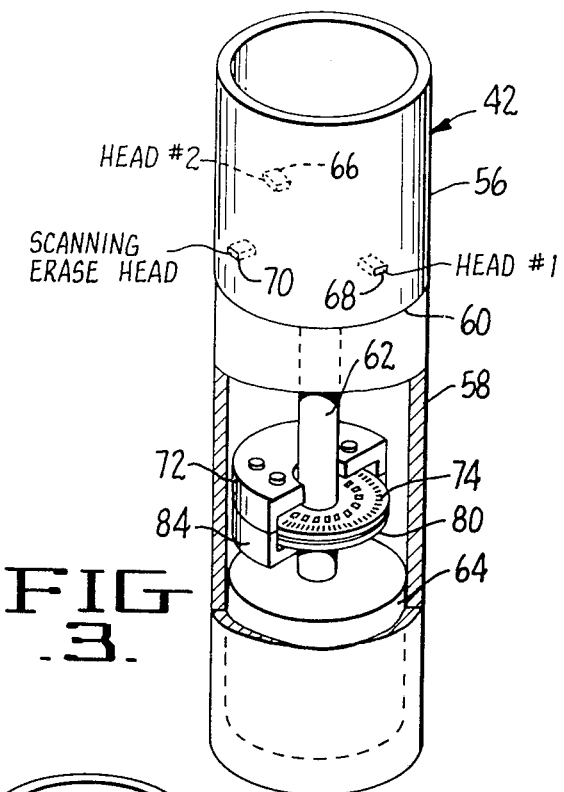
FIG. 3 is a partially cut-away schematic perspective view of a scanner assembly used in the transport assembly of FIG. 2.
Figure 5:
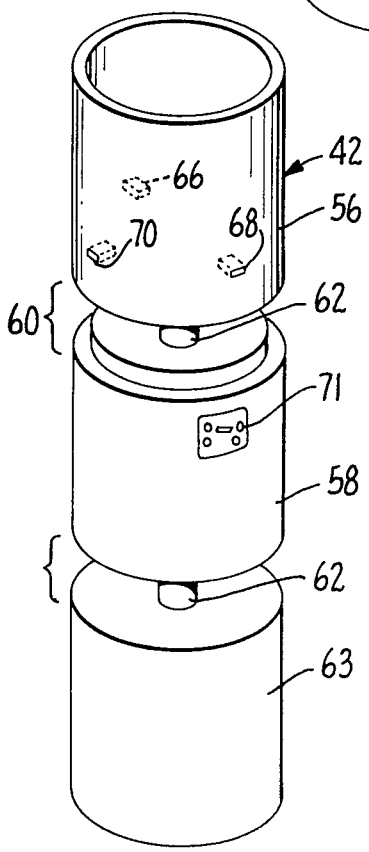
FIG. 5 is a further schematic perspective view of the scanner assembly of FIG. 3, showing its major subassemblies and the location of the control track head.
Figure 4:
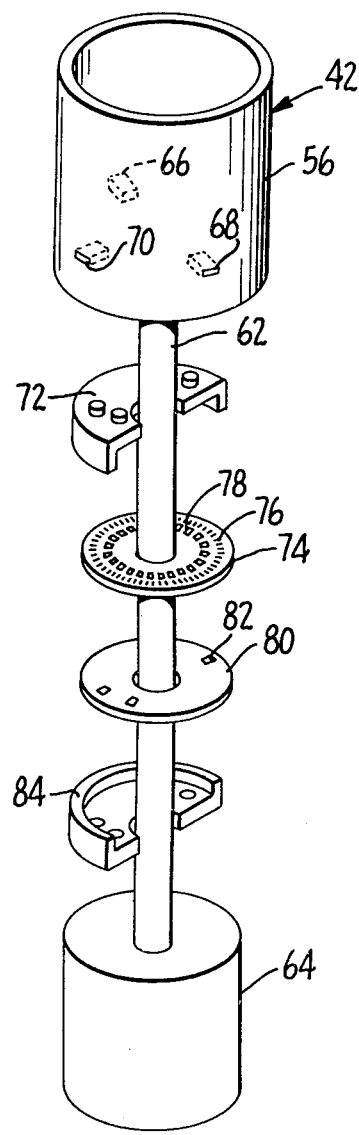
FIG. 4 is an exploded perspective view of FIG. 3.

Referring now to FIGS. 3, 4 and 5 the scanner assembly 42 is shown in greater detail, although schematically, omitting mechanical details not necessary to the understanding of the present invention.

Scanner assembly 42 comprises a stationary drum portion 58 that is fixed to the deck plates 10 and 12. A housing 63 holds a motor 64, described in greater detail hereinafter, driving a central shaft 62 that carries a rotating drum portion 56 which is spaced apart from the stationary drum 58 by a small gap 60. Drums 56 and 58 are both cylindrical and their outer surface dimensions are machined for close tolerance with each other, although as explained below, due to the configuration of the scanner assembly 42, the tolerance is not as exacting as would typically be required.

A control track record and playback head 71 is located on the fixed drum 58 in order to contact the tape 28 while wrapped around scanner assembly 42, thus reducing errors due to tape stretch and mechanical tolerances when the control track head is separated a distance from the video head assembly.

Three heads, a first video head 66, a second video head 68 and a scanning erase head 70, are carried in the upper drum in a single plane perpendicular to the shaft 62. The tape contacting tips of the heads extend slightly beyond the drum periphery in order to contact the tape 28 when it is wrapped around the scanner assembly 42. The scanning erase head is dimensioned to erase two video tracks per revolution. Video heads 66 and 68 are hot pressed ferrite type having f-equency responses well beyond 12MHz. As explained further below, there is a mechanical overlap when the first video head 66 and the second video head 68 are both in contact with the video tape. This overlap is critical to the operation of the present invention.

A rotating optical disc 74 is fixed to shaft 62 and therefore rotates in synchronism with the rotating drum 56. Disc 74 carries an outer set of indicia 76 for use in driving the motor, and an inner set of indicia 78 to provide tachometer pulses and an indicator of the video head 66 (head "1") position, as will be explained further below in connection with FIGS. 6A, 6B and 6C.

A static (stationary) disc 80 having slots 82 is positioned in juxtaposition below the rotating disc 74. The slots operate in conjunction with the rotating disc 74 and sets of light sources and light sensors to provide desired signals. Further details of the static disc 80 are set forth in the discussion of FIG. 7.

A horseshoe shaped stationary member 72 is located adjacent and above the rotating disc 74. Member 72 holds a plurality of light sources as will be shown in further detail in FIG. 8.

A second horseshoe shaped stationary member 84 is located adjacent and below static disc 80. Member 84 holds a plurality of light sensors as will be shown in further detail in FIG. 9.

Figure 6A:
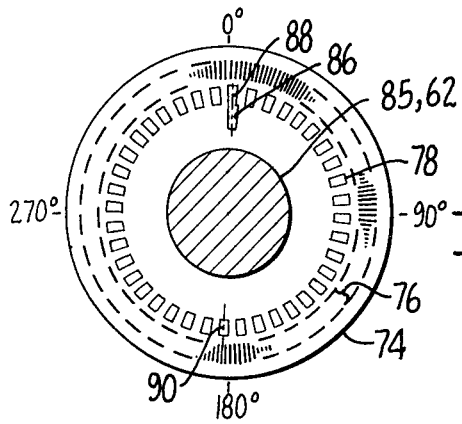
FIG. 6A is a plan view of the rotating tachometer disc used in the scanner assembly of FIG. 3.
Figure 6B:
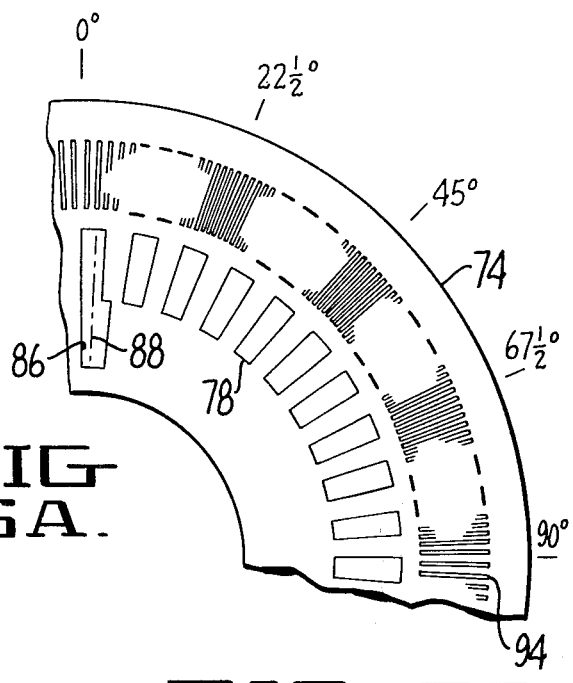
FIG. 6B is an enlarged section of the tachometer disc of FIG. 6A.
Figure 6C:
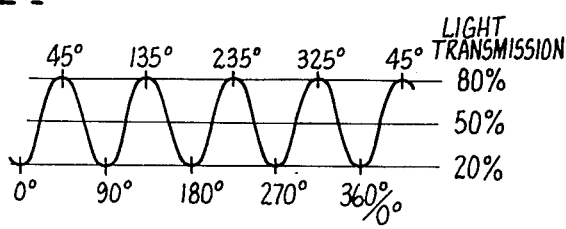
FIG. 6C is a sinusoidal waveform generated by the tachometer disc of FIG. 6A.

Referring now to FIG. 6A and 6B the details of the rotating optical disc 74 are shown in greater detail. Disc 74 is circular with a central circular cutout 85 for drive shaft 62. Except for the slots to be described, the disc 74 is opaque to light. A series of forty trapezoidal slots or optically clear areas comprising indicia 78 are equally spaced around the disc. Each area 78 is of the same size and is located the same radial distance along the disc 74. One area 78 has a further slot or clear area 86 abutting it. Slot 86 is used to provide an indication of the video head 66 (head "1") position. Disc 74 is precisely aligned with the rotating drum 56. Line 88 indicates the centerline and gap of the video head 66 (head "1"). One hundred and eighty degrees away, line 90 indicates the centerline and gap of the video head 68 (head "2"). The precise 180° separation of the two video heads is critical in order to avoid "dihedral" errors in record and playback.

The further set of indicia 76, located outside indicia 78 are intended to provide a sinusoidal light transmission. The sinusoidal waveform results from providing narrow slots 94 between a pair of radial distances on the disc 74 with the adjacent spacing between slots 94 varied so that the light transmission varies in the desired sinusoidal pattern. Although not shown for clarity in FIG. 6B, the slots 94 are continuously located around the disc with their spacing varied according to the desired sinusoidal waveform shown in FIG. 6C. Thus, the mark-space ratio defined by slots 94 produces a sine wave output as the disc 74 rotates.

Figure 7:
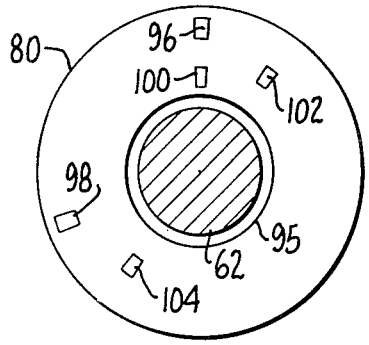
FIG. 7 is a plan view of the stationary tachometer disc used in the scanner assembly of FIG. 3.

In FIG. 7 the static disc 80 is shown in greater detail. The disc is circular and substantially identical in diameter to disc 74. A central circular aperture 95 is provided for mounting. The details of mounting the discs 80 and 74 are omitted as nonessential to the invention's understanding. Disc 80 is opaque to light and a pair of viewing apertures 96 and 98 located radially to line up with the slots 94 in disc 74 provide a look at sine and cosine variations in the slots 94 because the viewing apertures 96, 98 are spaced apart by 112½°, the physical distance necessary to provide a 90° electrical spacing for simultaneous sine and cosine readings from a single sine wave. A viewing aperture 100 is located to read the area 86 indicating the video head 66 (head "1"). A pair of viewing apertures 102 and 104, located 180° apart are positioned to read the slots 78.

Figure 8:
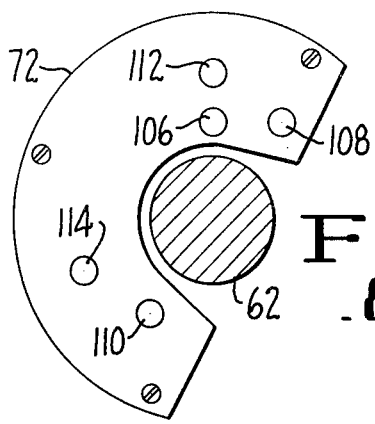
FIG. 8 is a plan view of a light source holder used in the scanner assembly of FIG. 3.
Figure 9:
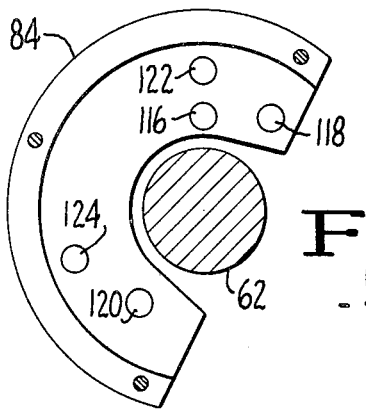
FIG. 9 is a plan view of a light sensor holder used in the scanner assembly of FIG. 3.

FIGS. 8 and 9 show members 72 and 84, respectively, in greater detail. Member 72 holds a plurality of light sources in the correct position in relation to the fixed disc 80, the rotating disc 74, and the locations of the light sensors in member 84 so that signals are provided corresponding to 1. each pass of the slot 86 over viewing area 100 to give a video head 66 (head "1") pulse,
2. a pair of tachometer signals at 40 times the rotating disc 74 rate as slots 78 pass over viewing areas 102 and 104, and
3. simultaneous sine and cosine signals as the sine wave slots 94 pass over viewing areas 96 and 98.

It will be apparent that many types of light sources and sensors can be used, for example, light emitting diodes (LED's) and phototransistors. LED 106 cooperates with phototransistor 116 to provide a head "1" pulse once every rotation of disc 74; LED's 108 and 110 cooperate with phototransistors 118 and 120, respectively, to provide two pairs of tachometer pulses at 40 times the disc 74 rotation rate; LED's 112 and 114 cooperate with phototransistors 122 and 124 to provide the sine and cosine signals.

Referring now to FIGS. 10A – 10F, details of the longitudinal head stacks 46, 48 and 50 are shown.

FIGS. 10A – 10C show front elevation, top plan and side elevation views, respectively, of the record/play head stack 48 and monitor head stack 40. Head stacks 48 and 50 are identical. Both stacks 48 and 50 include five heads disposed dimensionally as shown in the drawing, including in order from top to bottom: audio No. 2 head 350, cue head 352, audio No. 1 head 354, control track head 356, and address track head 358. The head locations are positioned to lay down the tracks shown in FIG. 11.

FIGS. 10D – 10F show front elevation, top plan and side elevation views, respectively, of the erase head stack 46. Stack 46 includes four heads disposed dimensionally as shown in the drawing, including in order from top to bottom: audio No. 2 erase head 360, cue erase head 362 and audio No. 1 erase head 364. A further head 366 having its gap angled at 19.55°, the angle of the video tracks is used as a playback video confidence head to assure that video has been recorded. There are no erase heads required for the control track or address tracks because these tracks are saturated recorded thereby erasing any previous information.

Figure 11:
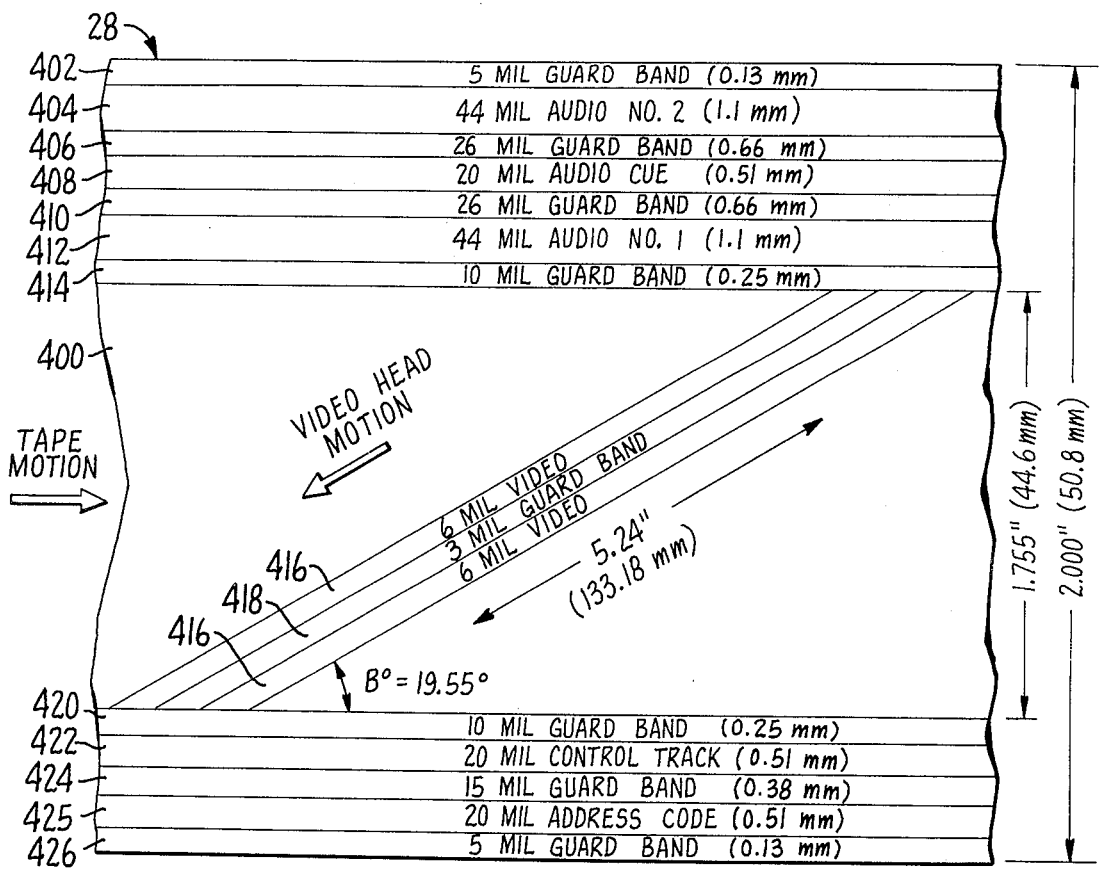
FIG. 11 shows the broadcast quality helical scan format recorded on tape by the apparatus of FIGS. 1-10.

FIG. 11 shows the format recorded on the tape 28 by the apparatus shown and described in conjunction with FIGS. 1–10 when the following dimensions, speeds and rotational rates are employed:

| | |
|---|---|
| angle between video heads 66, 68 and tape 28: | 19.6° |
| tape 28 longitudinal speed: | 8 ips |
| scanner 42 rotational rate (in NTSC the scanner rate is $\frac{58.94}{60} \times 9000$ rpm): | 9,000 rpm |
| scanner 42 diameter: | 3.17" |
| tape 28 wrap around scanner 42: | 188.57° |

Also, as explained further below, each video field is broken up into segments so that each video track carries only a portion of each video field. In NTSC (525 line, 60 Hertz) there are 5 scan segments; in PAL and SECAM (625 line, 50 Hertz) there are 6 scan segments. In both systems, there are 52 or 53 horizontal video lines per segment.

Tape 28 is nominally 2 inches in width, with the video track area 400 occupying 1.755 inches generally in the center of the tape. Beginning from the top edge of tape 28, a 5 mil guard band 402 is provided in order to protect the next adjacent 50 mil audio track 404 (audio "No. 1") from edge effects. Next a 20 mil guard band 406 separates audio track 404 from a 20 mil audio cue track 408. A 20 mil guard band 410 separates the audio cue track 408 from a 50 mil audio track 412 (audio "No. 1"). A 10 mil guard band 414 separates audio track 412 from the video track area 400. Since the video tracks are not parallel to the audio tracks, only a 10 mil guard band is necessary to avoid crosstalk between track 412 and the video tracks in area 400.

The video tracks 416 are 6 mils wide, separated by 3 mil guard bands 418. Tracks 416 form an angle B of about 19.55° to the audio tracks and tape edge. The length of each video track is 5.243 inches. Taken with the other physical parameters, this results in a video writing speed (head/tape speed) of 1500 ips in both NTSC and PAL/SECAM systems.

Below the video record area 400 is a further 10 mil guard band 420, followed by a 20 mil control track 422. A 15 mil guard band 424 separates track 422 from a 20 mil address code track 425. A 5 mil guard band 426 separates the address code track 424 from edge effects.

Figure 12A:
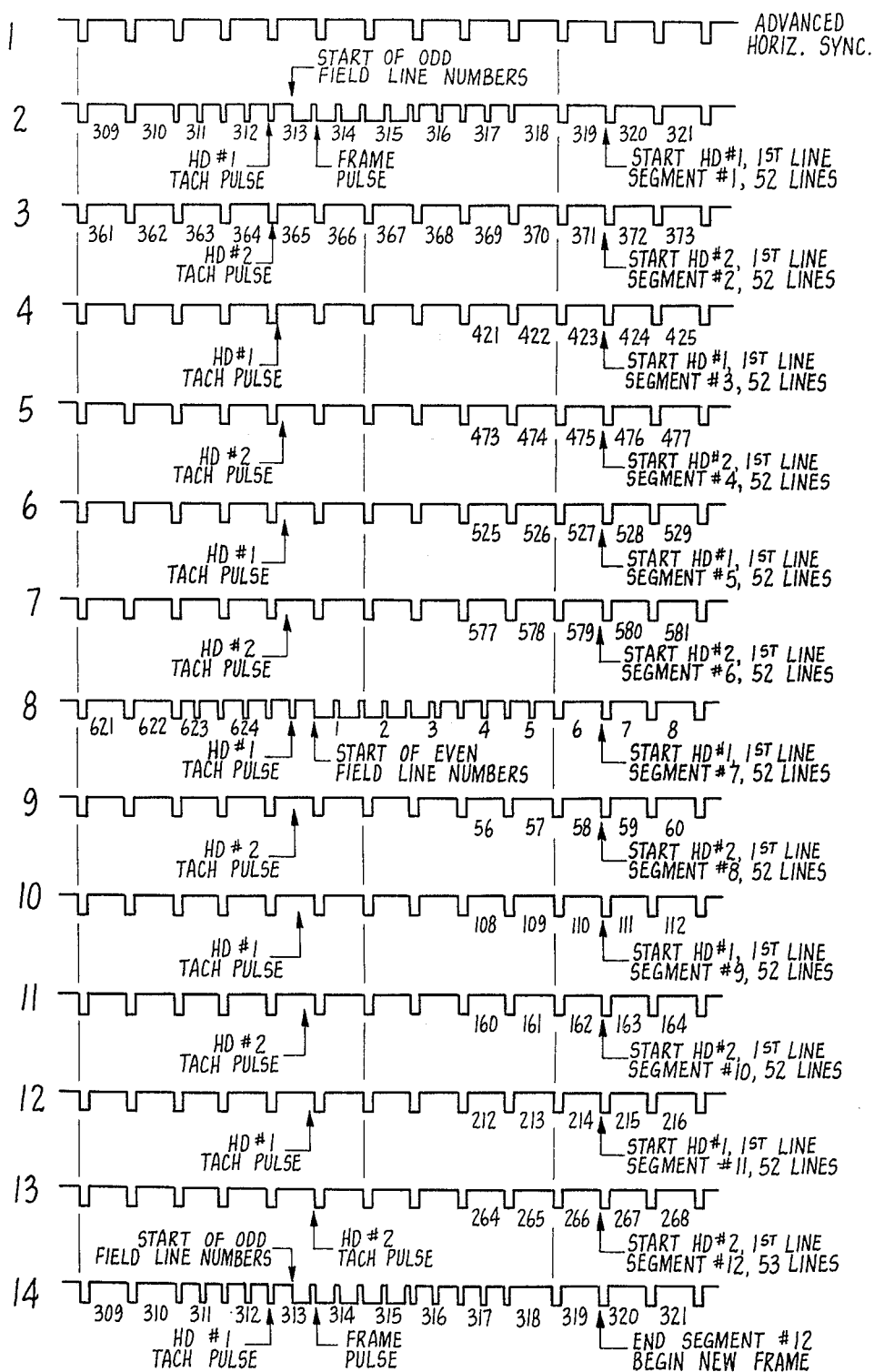
FIG. 12A is a graphical presentation of the video head switching sequence for the 50 Hertz, 625 line PAL/SECAM system version of the apparatus of FIGS. 1-10.

FIG. 12A shows the head switching sequence for the 50 Hz, 625 line PAL and SECAM system version of the present invention. As mentioned above, each video frame is divided into 12 segments, each segment occupying a single video track.

In order to clarify the timing relationships among (1) the tach pulses, (2) the advanced off-tape horizontal sync pulses (as explained further in connection with FIG. 17A, below), and (3) the head switching segments in playback, the Figure shows the synchronizing pulses adjacent the scheduled head switch times. The head switch times shown in the diagram are those set by the logic circuit described in FIG. 15, below. Line (1) of the Figure shows the advanced horizontal sync pulses (of FIGS. 14–17) which are synchronous with the other sync pulses of this Figure. As shown in the Figure, the Head "1" tach pulse is the positive going edge of the 150 Hz tach signal (see FIG. 14B) from scanner disc 74 and the head "2" tach pulse is the negative going edge of the 150 Hz tach signal. In line (2), the head "1" tach pulse occurs at the start of horizontal line 313 (of the 625 lines per frame). Line 313 is within the vertical interval which includes the frame pulse (the second broad vertical pulse). It will be noted that the succeeding vertical interval is offset 1/2 horizontal line (due to the odd number of lines - 625) so that the vertical pulse edges do not coincide with the horizontal pulses. The beginning of segment 1 starts six horizontal lines after the frame pulse. Head "1" is active during segment 1. The logic disclosed in FIG. 15 provides the head switch at the beginning of line 320 and throughout this timing diagram. The head activity segments proceed as follows:

| Segment | Head Active | Lines Active | Total Lines |
|---|---|---|---|
| 1 | 1 | 320–372 | 52 |
| 2 | 2 | 372–424 | 52 |
| 3 | 1 | 424–476 | 52 |
| 4 | 2 | 476–528 | 52 |
| 5 | 1 | 528–580 | 52 |
| 6 | 2 | 580–7 | 52 |
| 7 | 1 | 7–59 | 52 |
| 8 | 2 | 59–111 | 52 |
| 9 | 1 | 111–163 | 52 |
| 10 | 2 | 163–215 | 52 |
| 11 | 1 | 215–267 | 52 |
| 12 | 2 | 267–230 | 53 |

It will be noted that the head "1" and head "2" tach times "drift" over one horizontal line during each frame and then return. This results from the non-integral relationship between the 150Hz/300Hz tach pulses and the 15,625 Hz horizontal frequency. By providing a 53 line twelfth segment, the additional odd line is accommodated during the vertical interval and the tach signals and horizontal pulses are brought into synchronism--in effect the H/12 shift (where "H" is a horizontal line) each segment results in the tach signal "catching up" with the horizontal pulse for line 313. It will also be noted that the heads do not alternate on corresponding segments in each field (segments 1–6 are in one field, segments 7–12 another).

Figure 12B:
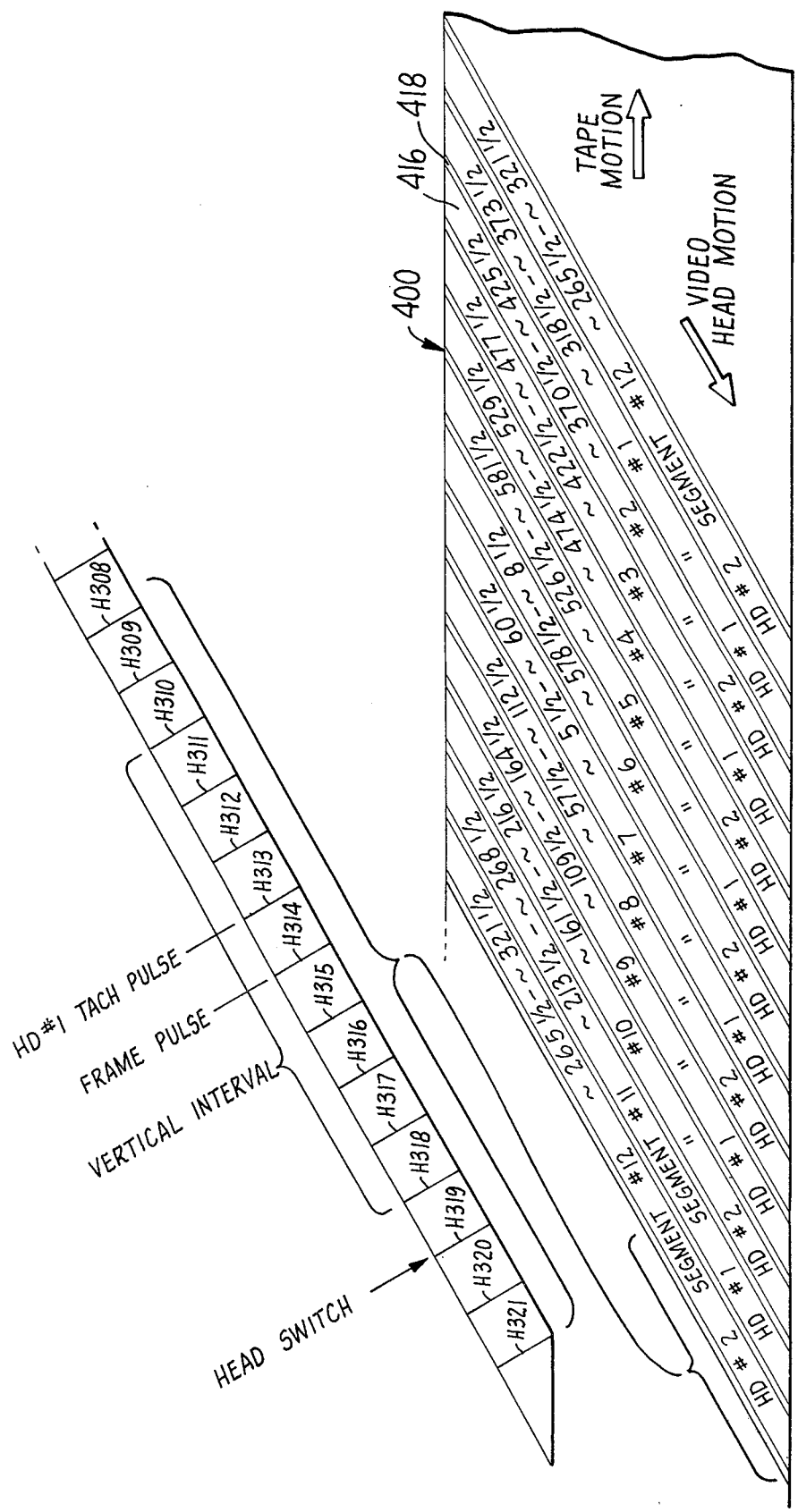
FIG. 12B is a detail of the video track portion of a recorded tape showing the details of the segmentation.

As will be better understood with reference to FIG. 12B, the head to tape contact time is constant (within the mechanical tolerances of the apparatus) and there is an overlap time when both heads are in contact with the tape due to the 180° relationship of the heads and the 188.57° wrap of the tape around the scanner. This overlap is critical to the present invention and must include at least an overlapping color burst from each head. With respect to the physical relationship of the heads to the tape, the non-integral horizontal pulses can be viewed as moving with a cumulative shift of one line (1H) per monochrome frame (or H/12 per segment).

FIG. 12B is a schematic representation of the video portion 400 of the tape 28 indicating the approximate horizontal line numbers recorded on each succeeding track. Slight variations will occur due to mechanical tolerances of the apparatus. Although several horizontal lines are shown to overlap, the present invention only requires that a color burst overlap. That is, substantially less than one horizontal line of overlap is required. As a part of the lock up procedure in the VTR, the head 1 pulse is locked to the reference frame signal, consequently due to the head segment timing scheme, the frame pulse is recorded in the position shown on the segment 12 track. In playback, the head "1" pulse and the tape frame maintain this same relationship after the lock up of tape frame with reference frame.

Figure 13A:
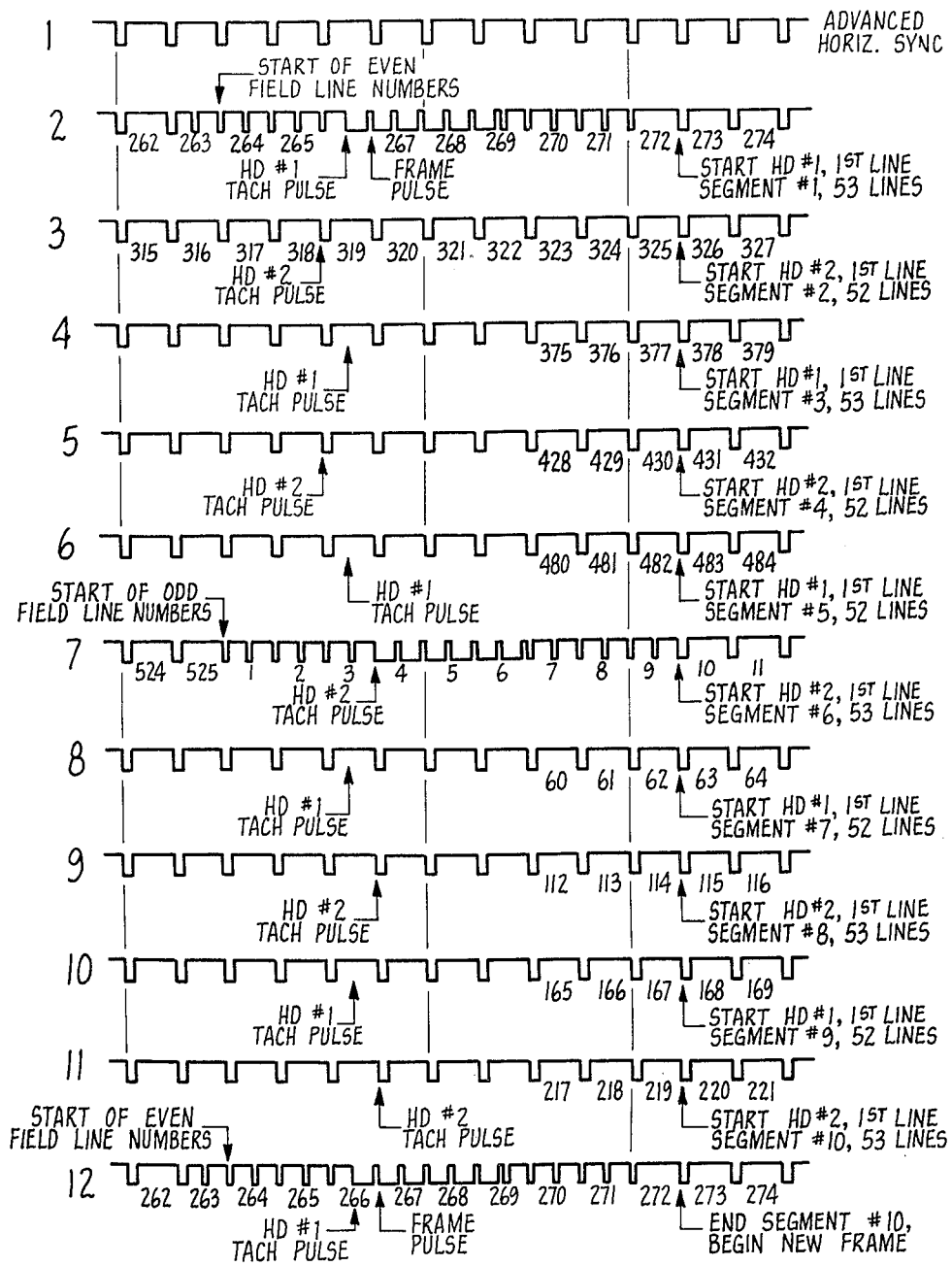
FIG. 13A is a graphical presentation of the video head switching sequence for the 60 Hertz, 525 line NTSC system version of the apparatus of FIGS. 1-10.

FIG. 13A corresponds to FIG. 12A and shows the sequence for the 60 Hz, 525 line NTSC embodiment of the invention. The logic circuit implementing this timing chart is disclosed in FIG. 19. The head "1" tach pulse is a half line before the frame pulse, as shown in line (2). Segment 1 begins six lines after the frame pulse, as in the PAL/SECAM version. In other respects, however, the relationships of the 15,734.26 Hz horizontal rate, the 60 Hz vertical rate, the 525 lines per frame and the 150Hz/300Hz scanner tach signals cause the tach pulses to vary in a manner different from the PAL/SECAM timing chart of FIG. 12A. With respect to the NTSC horizontal pulses, the head tach pulses vary ½ horizontal line. Also, in the NTSC, version it is desirable to alternate heads on corresponding segments in order to reduce subjective color phase errors. Hence, the NTSC Switching sequence is more complex than in the PAL/SECAM sequence of FIG. 15A:

| Segment | Head Active | Lines Active | Total Lines |
|---|---|---|---|
| 1 | 1 | 273–326 | 53 |
| 2 | 2 | 326–378 | 52 |
| 3 | 1 | 378–431 | 53 |
| 4 | 2 | 431–483 | 52 |
| 5 | 1 | 483–10 | 52 |
| 6 | 2 | 10–63 | 53 |
| 7 | 1 | 63–115 | 52 |
| 8 | 2 | 115–168 | 53 |
| 9 | 1 | 168–220 | 52 |
| 10 | 2 | 220–273 | 53 |

Segments 1–5 comprise one field; segments 6–10 a succeeding field.

Figure 13B:
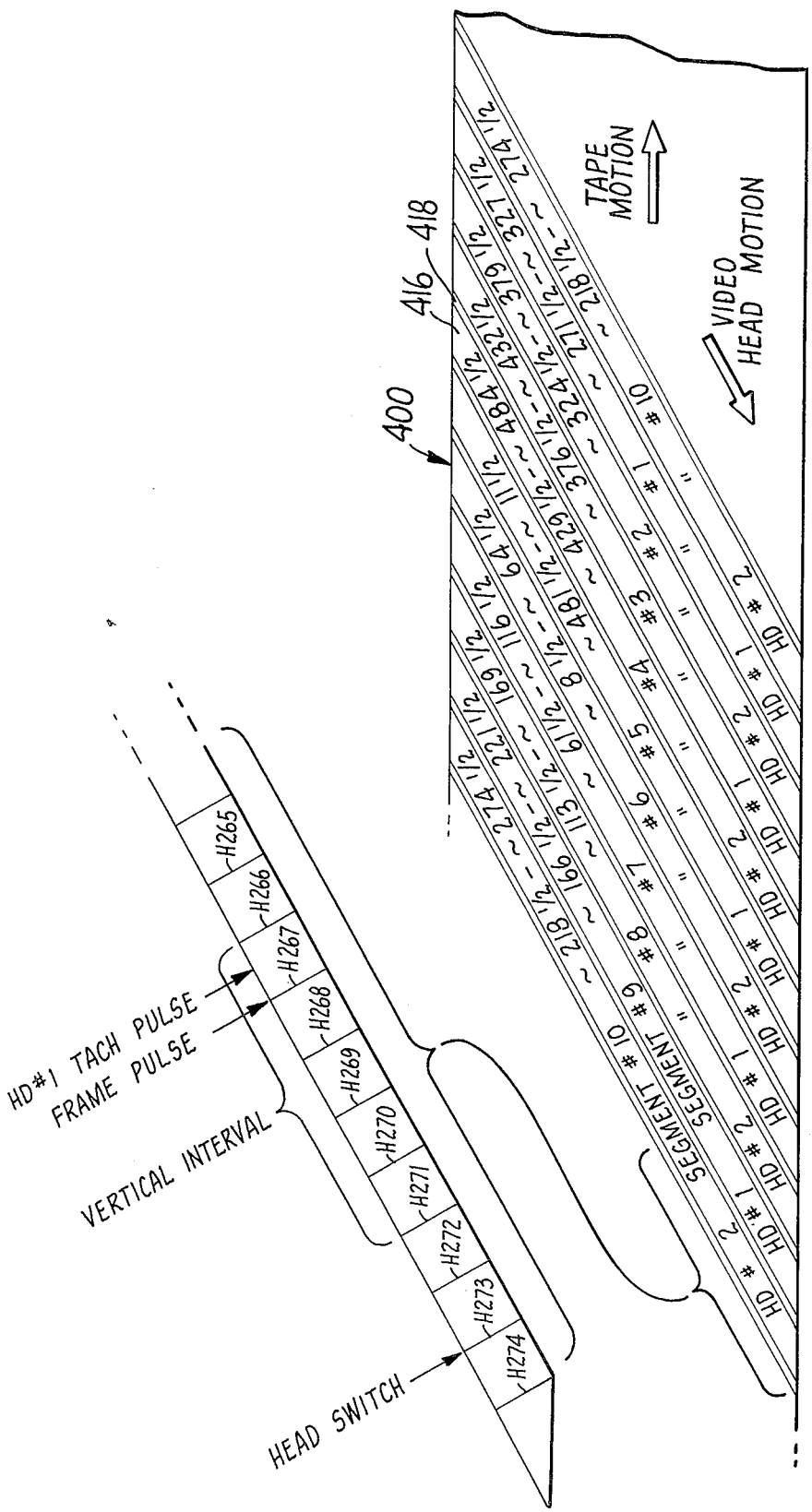
FIG. 13B is a detail of the video track portion of a recorded tape showing the details of the segmentation.

FIG. 13B corresponds to FIG. 12B and shows the approximate lines recorded on each succeeding video track 416 on the video portion 400 of the tape 28. As in the NTSC version, there is an overlap when both heads are picking up the same recorded information and for the present invention it is sufficient that the two heads reproduce the same color burst.

Figure 14A:
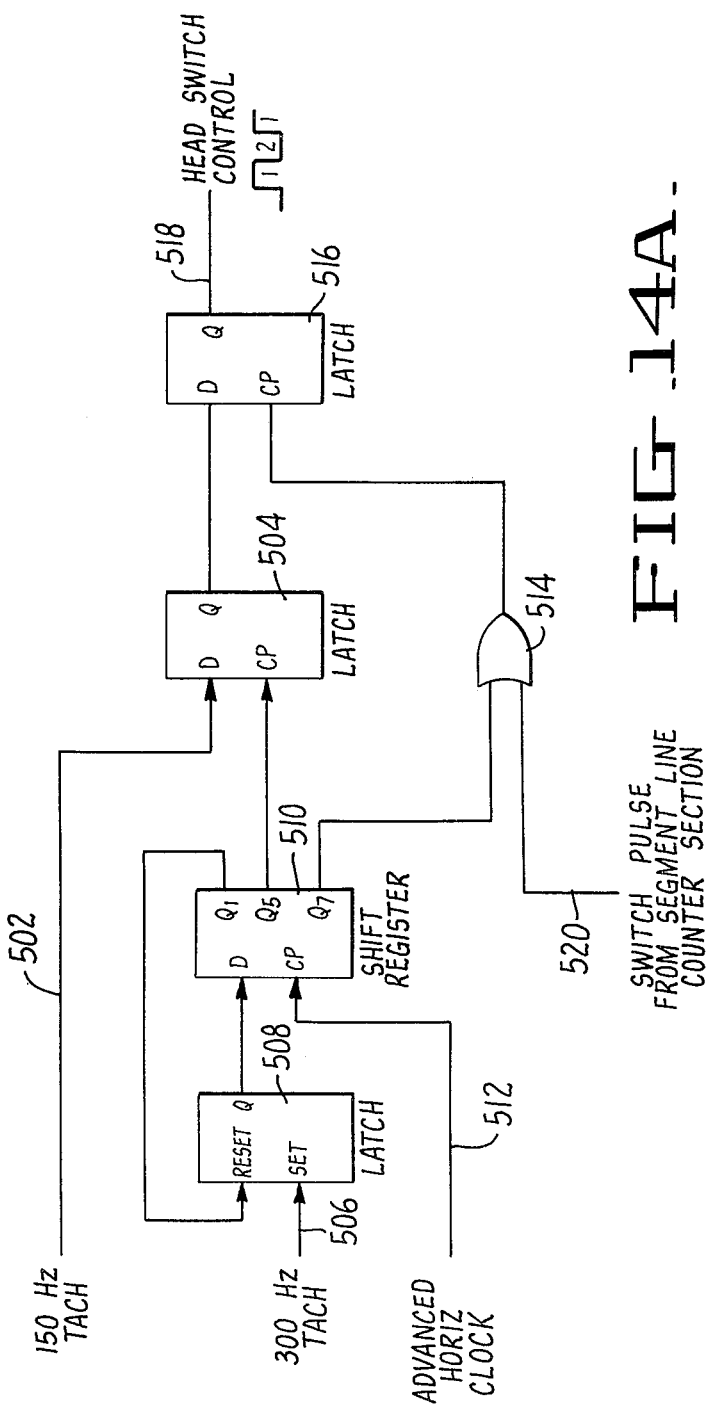
FIG. 14A is a block diagram of the logic circuit for providing tachometer controlled head switching in both NTSC and PAL/SECAM systems.

FIG. 14A shows in block form, the logic for providing head switching for both the NTSC (525 line) and PAL/SECAM (625 line) systems controlled by tachometer signals from the scanner disc 74 (FIG. 6). Head switching by the tachometer signals is needed when the machine is not yet locked up horizontally (i.e., the off tape horizontal is not yet phase locked to the reference (studio) horizontal). Details of the lock up sequence and servo systems associated therewith are disclosed in said copending applications of Kenneth Louth, U.S. Ser. Nos. 285,917 and 356,380. Prior to horizontal lock up there is no tape frame signal, hence it would be possible, absent the tachometer head switch control, to choose the wrong field as the frame. Also, once lock up is achieved, this arrangement is useful if the tape frame signal is missing.

The 150 Hz signal on line 502, shown in FIG. 14B is applied to the data input of a latch 504. The 300 Hz tach signal on line 506, shown in FIG. 17C is applied to the set input of a latch 508. The output Q of latch 508 is applied to the data input of a seven place shift register 510. Advanced horizontal sync pulses on line 512 are applied to the clock pulse input of register 510. The sources of the 150Hz, 300Hz and advance horizontal sync signals are explained further below.

Figure 26:
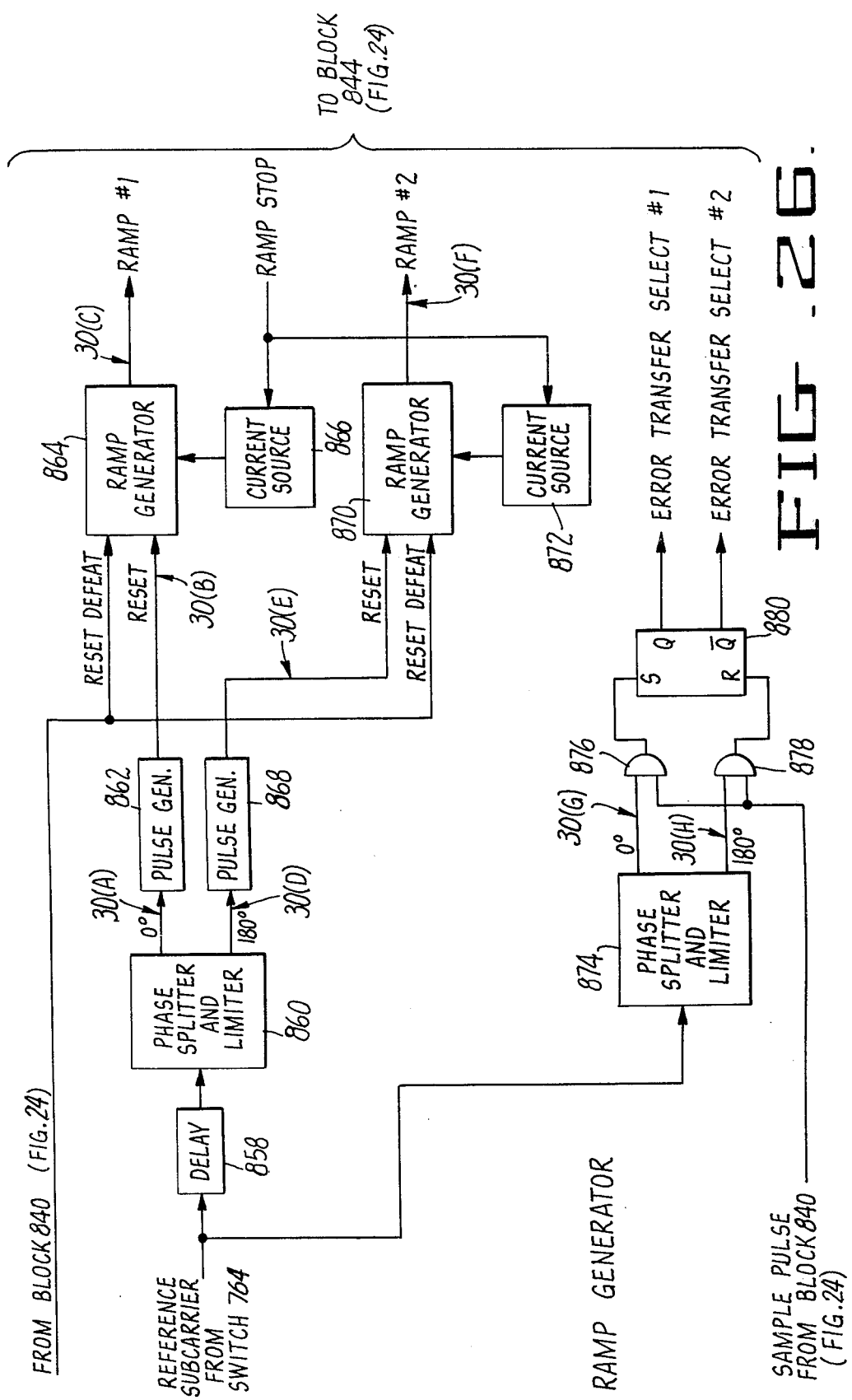
FIG. 26 is a block diagram showing the ramp generator of FIG. 24 in greater detail.

The "one" count Q1 output of register 510 is applied to the reset input of latch 508 and the "5" count Q5 output of register 510 is applied to the clock pulse input of latch 504. The "7" count Q7 output of register 510 is applied to one input of OR-gate 514. The other input to OR-gate 514 is on line 320 from a segment line counter logic; the logic for PAL/SECAM is shown in FIG. 15; the logic for NTSC is shown in FIG. 26. The OR-gate 514 output is to the clock pulse input of latch 516. Latch 516 receives its data input from the output of latch 504. The output Q of latch 516 provides the head switch control on line 518, high for head "1", low for head "2".

In operation, a portion of the 300Hz tach pulse is allowed into shift register 510, which resets latch 508 after 1 horizontal pulse (1H). The tach pulse is clocked through the shift register 510 by the advanced horizontal pulses. The 150Hz signal is high at every other head pass; the 200 Hz signal goes high at every head pass. Assume first that both are high. In that case, the 150Hz pulse would be present at the data input of latch 504 and would be clocked through after a delay of 5 horizontal lines (5H). Thus after the 5H delay, latch 516 has a data input and requires only a clock pulse to provide a high output. Such a clock pulse is provided by a signal at either input of OR-gate 514. In the absence of any signal on line 520 in the interim, the "7" count Q7 of register 510 provides a signal to latch 516 which causes a high signal on line 518. When the 150 Hz signal is low, the same procedure occurs except that the output on line 518, consequently, will be low. As shown below, a high signal on line 518 selects head "1" as the playback head, a low signal head "2". Thus head switching will occur, at the latest, 7 horizontal lines after the 300Hz tach signal goes positive.

As explained further below, the tach signals "drift" with respect to the horizontal pulses within each frame because of the odd number of horizontal pulses in each frame. The tachometer signals provide an indication of the physical location of the video head 66, 68. It should be recalled that as a part of the horizontal lock up procedure, the tape frame is positioned so that head "2" reproduces it.

Referring now to FIG. 15, the block diagram of the PAL/SECAM (625 line) segment line counter is shown. This logic circuit, and the circuit of FIG. 16 for NTSC, provide a more precise head switching and this circuit accounts for the odd number of horizontal lines in PAL/SECAM by putting an extra line in the segment containing the vertical interval. The tachometer switch line is not suitable because by not putting the extra line in the vertical interval, two adjacent horizontal lines will not be reproduced from the same lead once per frame. Desirably, Adjacent lines are reproduced by the same head, thus reducing any "banding" effects.

Advanced horizontal clock pulses are applied to the clock pulse inputs of latch 522, divide by 51 counter 524 and divide by 5 counter 526. A signal occurring at every tape frame (the second vertical sync pulse coincides with the horizontal clock only every 2 fields— thus is taken as the tape frame signal) is applied to the set input of latch 528. The output Q of latch 528 is connected to the enable input of counter 526 and to one input of OR-gate 532. Counter 526's output is applied to the reset input of latch 528 and to an input of OR-gate 530.

The output of OR-gate 532 is applied to the clear input of counter 524. The counter 524 output is applied to the other input of OR-gate 530, which has its output applied to the data input of latch 522. Latch 522 provides the output on line 520 to OR-gate 514 of FIG. 14A. The output is also applied to the other input of OR-gate 532.

In operation, the tape frame signal sets latch 528, enabling ÷5 counter 526 and clearing ÷51 counter 524. Five horizontal (5H) pulses after the tape frame ÷5 counter 526 provides a signal to OR-gate 530 and hence to the data input of latch 522, meanwhile ÷51 counter 524 is held clear. Latch 522 adds one horizontal count and also makes the output synchronous with the horizontal pulses. Divide by five counter 526 and divide by 51 counter 524 are non-synchronous; the latch 522 is used to make the line 520 output synchronous. Thus at six horizontal pulses past tape frame head switching is achieved if the 5 horizontal line delayed 150Hz tach signal is present (FIG. 17). This head switch ends segment 12, which, as shown in FIG. 12, ends six horizontal lines after the frame pulse and has 53 horizontal lines.

When ÷5 counter 526 reached its five count, it resets latch 528, thus removing the clear signal from ÷5 counter 524. Counter 524, however, was cleared by the output on line 520. On the next horizontal pulse following the output on line 520, ÷5 counter begins counting and provides an output to OR-gate 530 and the data input of latch 522 which adds one count and provides a synchronous output on line 520 after 52 horizontal lines thus defining segment one. The sequence repeats itself through the segments 1 through 11 that are each 52 lines long. The 12th segment is 53 lines long by operation of the tape frame and ÷5 counter 526 as described above.

The switching sequence for the 525 line NTSC system is somewhat more complex. Logic for accomplishing the NTSC switching is shown in FIG. 16. The circuit is in some respects identical to FIG. 15 and the same reference numerals are carried through on corresponding elements. The description of the identical portions will not be repeated.

A ÷52 counter 524' is provided having ÷51 and ÷52 outputs. It is desired to provide 52 line segments for segments 2,4,5,7, and 9, whereas for the remaining segments 53 lines are desired. The ÷5 counter 526 activated by the frame pulse provides a 53 line last segment (segment 10 in NTSC) as in the PAL/SECAM circuit. In order to provide the 52 line segments at the appropriate times, a counter, decoder and gating arrangement is provided to pass the ÷51 output from counter 524' at the proper times.

The 300 Hz tach signal is applied to the clockpulse input of a divide by 5 counter 540. counter 540 Counter binary output lines $A(2^0)$, $B(2^1)$, $C(2^2)$. The A line is connected to an OR-gate 542. The B line is not connected; the C line is connected to one input of an AND-gate 544 and to the clock pulse input of a divide by 2 counter 546. The output of counter 546 is applied to a not input of AND-gate 544. The gate 544 output is applied to gate 542, the output of which is, in turn, applied to an AND-gate 548. The other input to gate 548 is from the ÷51 output of counter 524'. The latch 528 output is further applied to the preset input of counter 540, which presets the counter to a count of four, and to the set input of counter 546.

Generally stated, the additional logic elements provide an input to AND-gate 548 at segments 2, 4, 5, 7 and 9 to permit the ÷51 output from counter 524' to reach OR-gate 530 and latch 522 which adds one count, making it 52 lines as desired, and makes the output synchronous. The output on line 520 clears counter 524' so that the counter sequence count may be repeated.

FIG. 17A shows in block diagrammatical form the circuitry for providing the advanced horizontal clock pulses and the tape frame pulses. In FIG. 17B a portion of a television waveform centered around a horizontal sync pulse 560 is shown. The so-called front porch 562 follows the video information 564 and precedes the horizontal sync pulse 560. The desired time for accomplishing a head switch is in the middle of the "front porch" 562 so that neither the video 564, sync pulse 560, nor color burst 566 is interrupted. Interruption of the sync pulse, for example, could affect the stability of the played back video signal. Due to the inherent delay in the handling of the video signal in the VTR, which is the cumulative effect of input filtering, modulation and demodulation, etc., it is necessary to "advance" the off-tape horizontal sync signals so that the head switch occurs in the middle of the front porch at time $t_2$. Due to the VTR time delay the switching would occur at about time $t_1$, thus the horizontal sync pulses must be "advanced" by the $(t_2-t_1)$ delay time.

Referring to FIG. 17A, off tape composite sync is applied to an equalizing pulse eliminator 570, which may take the form of a one-shot having a period greater than ½H and less than H so as to ignore the serrations in the equalizing pulses, and to a field detector 572, which provides an output to AND-gate 574 at the start of the second broad pulse of every vertical interval. The horizontal pulse output from block 570 is applied to one input of a phase detector 576 that forms a part of a phase locked loop 578. Loop 578 includes a conventional loop compensation filter 580 receiving the detector 576 output. Filter 580 is connected to a voltage controller oscillator (VCO) 582 operating at a nominal frequency of $f_H$, the horizontal sync frequency. VCO 582 provides the advanced horizontal output because the loop includes a digital delay 584 between the VCO 582 and the other input to phase detector 576. Delay 584 provides a delay of 2.5 $\mu$ seconds, a time required to overcome the $(t_2-t_1)$ delay present in one particular working embodiment of the invention. The time may be varied in accordance with the requirements of a particular machine. Since the output from delay 584 to the phase detector is delayed, the loop output is therefore advanced by the delay time.

Because the timing of the tape frame pulse need not be as precise as the horizontal clock to the head switching circuits of FIGS. 14, 15 and 16, the tape frame signals may be derived by AND-gate 574 that provides a tape frame signal only when the tape field signal coincides with a horizontal pulse, which occurs only every other field.

FIG. 17C shows the sources of the 300Hz and 150Hz signals for use in the head switching circuits of FIGS. 17, 18 and 19. When the scanner is run at a 150Hz rotation rate, then the pulses from the scanner tachometer are at a 6KHz rate (40 slots × 150Hz). The 6KHz tach signal is applied to a divide by 40 counter 590 and to a divide by 20 counter 592. The head "1" pulses (at 150Hz) from scanner tachometer disc 74 are applied to counters 590 and 592 in order to synchronize the counters. Thus counter 590 provides a 150Hz square wave signal synchronized with head "1" and 590 provides a 300Hz square wave signal synchronized with head "1".

Figure 18B:
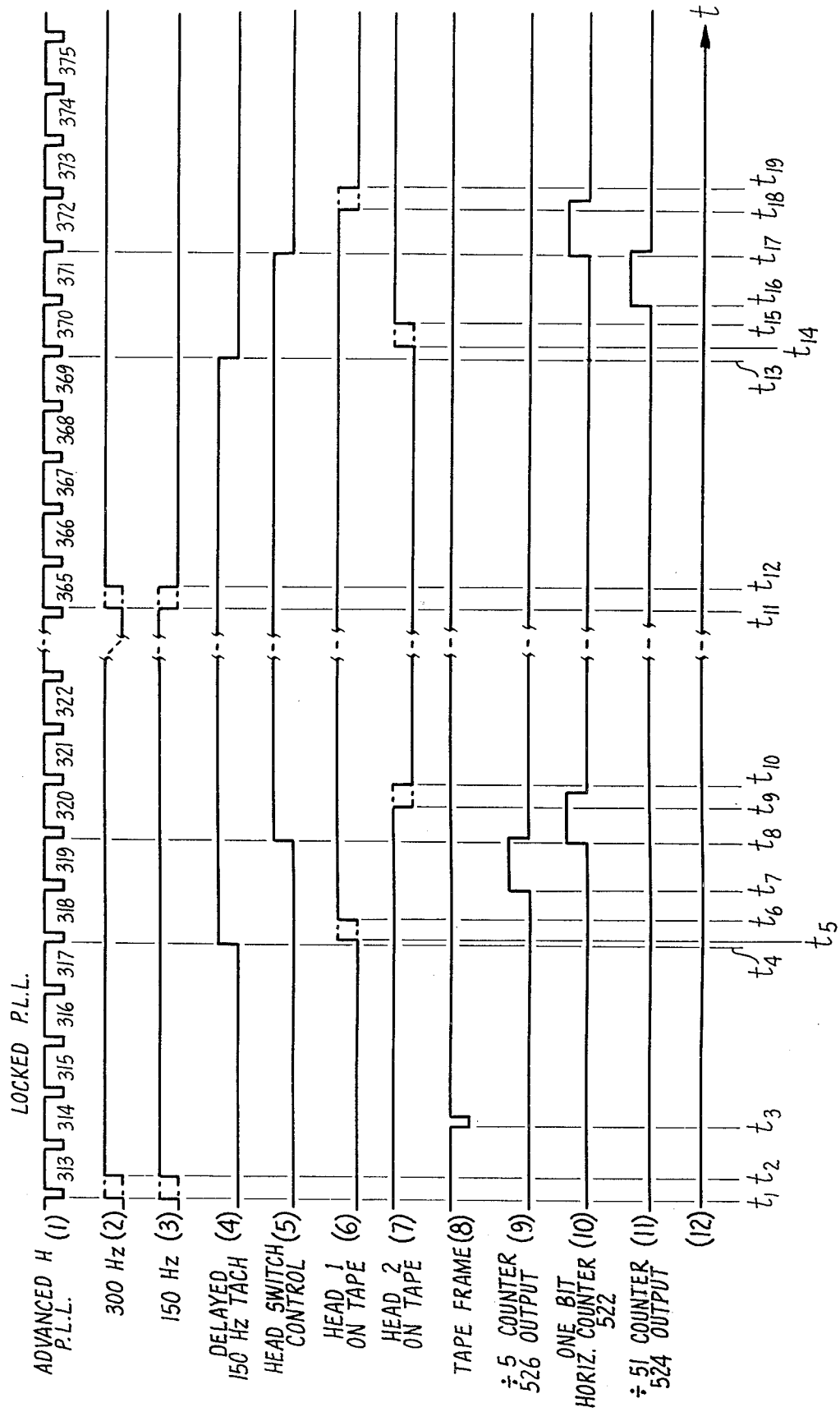
Figure 1B:
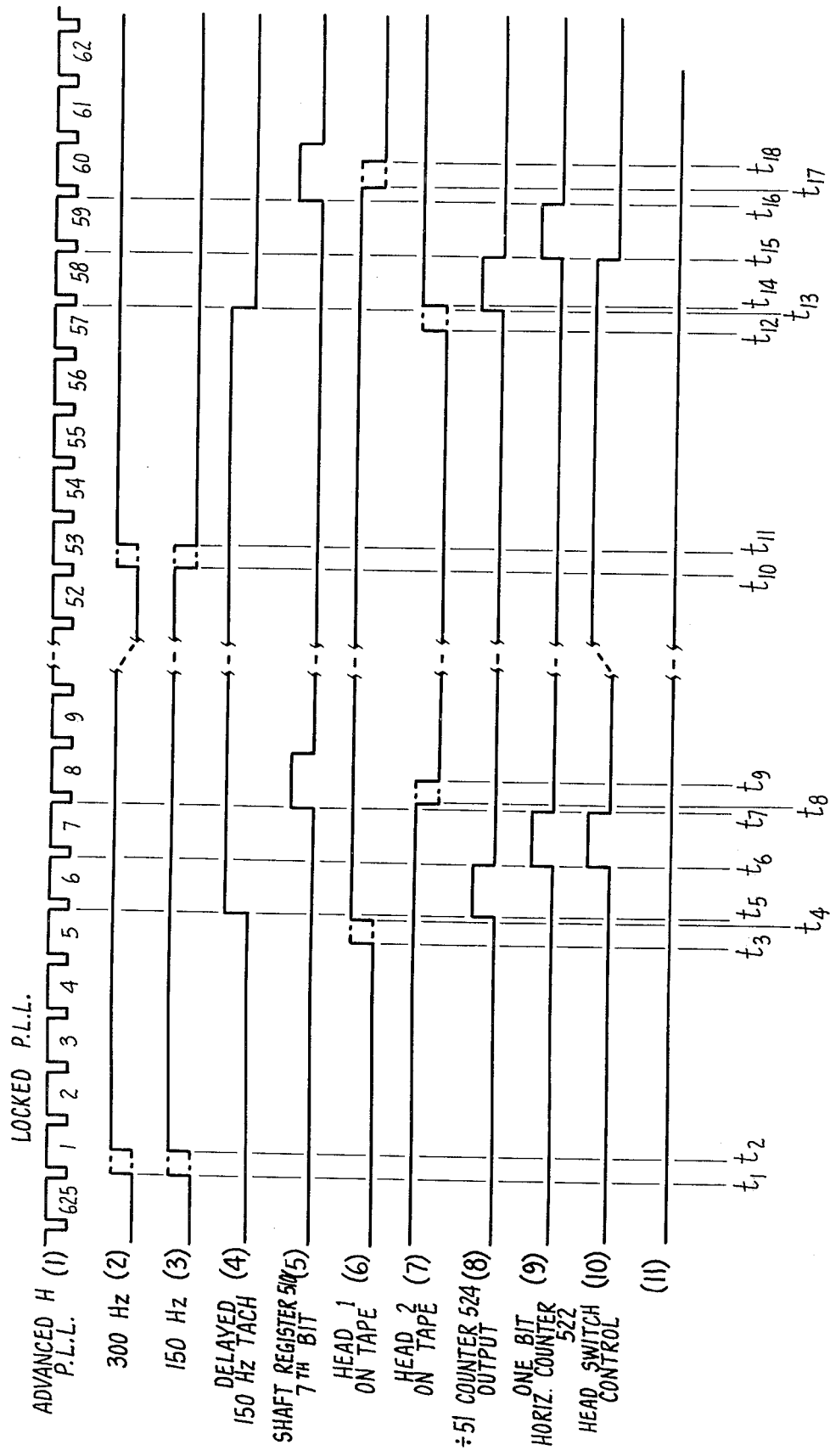

FIGS. 18A – 18C show various timing waveforms useful in gaining a better understanding of the head switching sequences and the operation of the circuits of FIGS. 14 and 15.

In FIG. 18A waveforms for the condition where the VTR tape signals are not phase locked to the reference signals are shown. The circuit of FIG. 14 thus provides the head switch control. This applies both to NTSC and PAL/SECAM versions. In line (1) the advanced horizontal pulses are shown. Lines (2) and (3) show the 300Hz and 150Hz tach signals going positive somewhere between $t_1$ and $t_2$: since the VTR is not in its locked mode, the timing relationship between the tach signals and the advance horizontal is not defined. The circuit of FIG. 14 delays the 150Hz tach signal by 5H to $t_3$ (line 4) and provides the head switch control 2H later at $t_6$ (line 5). Physically, head "1" is first on the tape somewhere between $t_4$ and $t_5$, prior to the time ($t_6$) that the head switch control makes head "1" active. Head "2" leaves the tape between $t_7$ and $t_8$. The time ranges $t_4 - t_5$ and $t_7 - t_8$ for starting and ending head/tape contact are due to mechanical tolerances. When the 150Hz tach goes negative and the 300Hz tach goes positive again at $t_9 - t_{10}$ the 5H delay of the 150Hz tach occurs at $t_{11}$ and 2H later at $t_{14}$ the head switch occurs making head "2" active. Head "2" first touches the tape between $t_{12}$ and $t_{13}$ and head "1" leaves the tape between $t_{15}$ and $t_{16}$. FIGS. 18B and 18C show timing waveforms occurring in connection with the head switching controlled by FIGS. 14 and 15 for the 625 line PAL/SECAM system when the VTR tape signals are in phase lock with the reference signals.

In FIG. 18B, the head switch at $t_8$ occurs by the joint operation of the FIG. 14 and FIG. 15 logic. That is, the delayed 150Hz tach (line 4) plus 2H causes the head switch at $t_8$ (horizontal line 319). Also, the tape frame signal at $t_3$ results in an output from divide by 5 counter 526 at $t_7$ which is delayed one bit by latch (counter) 522 to provide the head switch control at $t_8$. Thus for the beginning of segment 1 at horizontal line 319, the tach switch and scheduled switch are simultaneous. It will be seen that this is not always the case, otherwise, as mentioned above, only the tach switch logic would be required. The next consecutive head switch at $t_{17}$ again occurs at the same time whether controlled by the tach logic of FIG. 14 or the logic of FIG. 15. In this case, the divide by 51 counter 524 plus the one bit delay by latch 522 causes the switch at the same time as the delayed 150Hz tach signal.

In FIG. 18C the FIG. 15 logic provides a head switch earlier than the tach signal switch signal of FIG. 14. Thus, the tach switch would occur at $t_7$ in the absence of a signal from one bit counter (latch) 522 at $t_6$. At the next succeeding switch, the one bit counter (latch) 522 provides a switch at $t_{15}$, earlier than the tach switch at $t_{16}$.

Figure 19A:
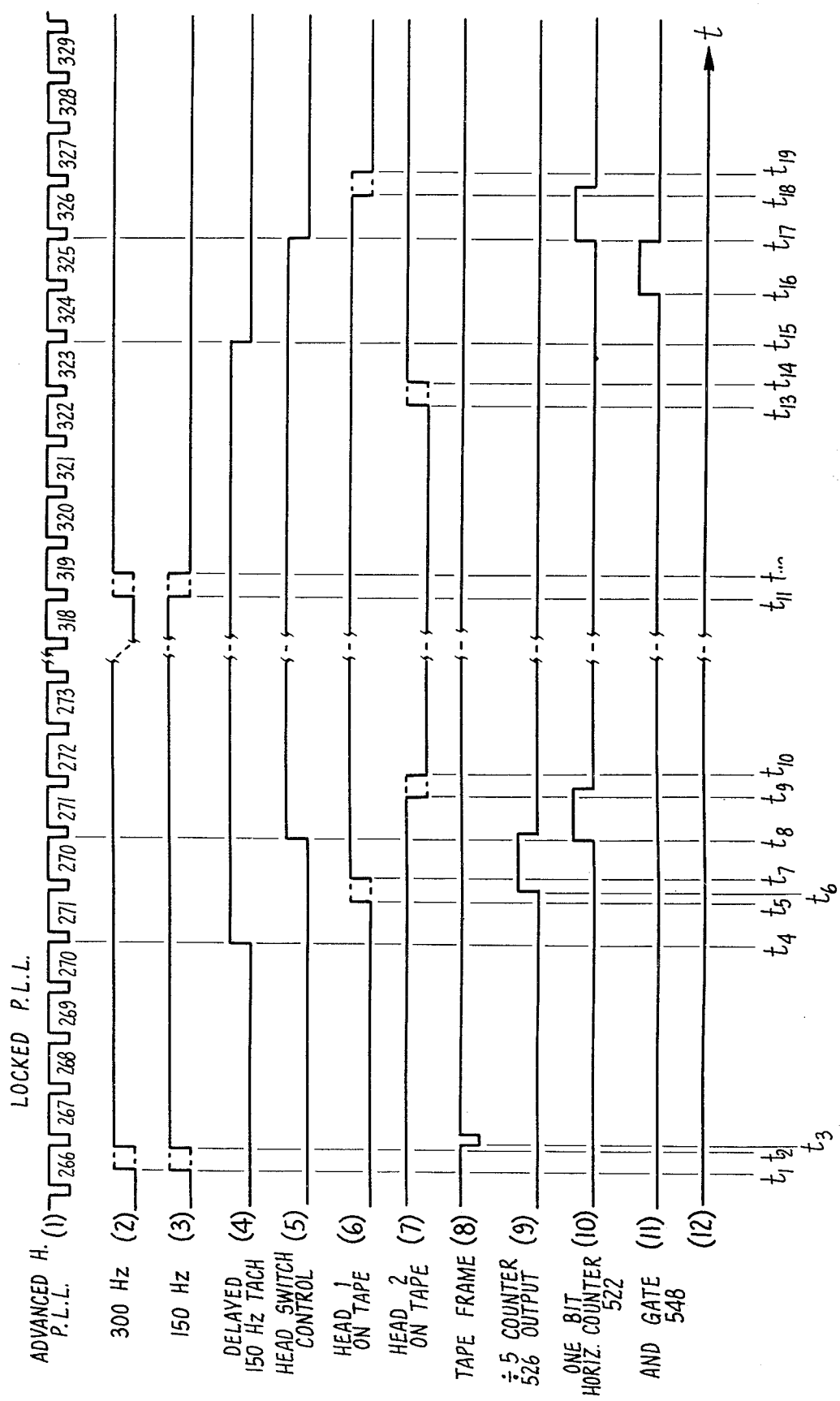
FIGS. 19A and 19B show various timing waveforms related to the video head switching sequences and the operation of the circuits of FIGS. 14 and 16.
Figure 19B:
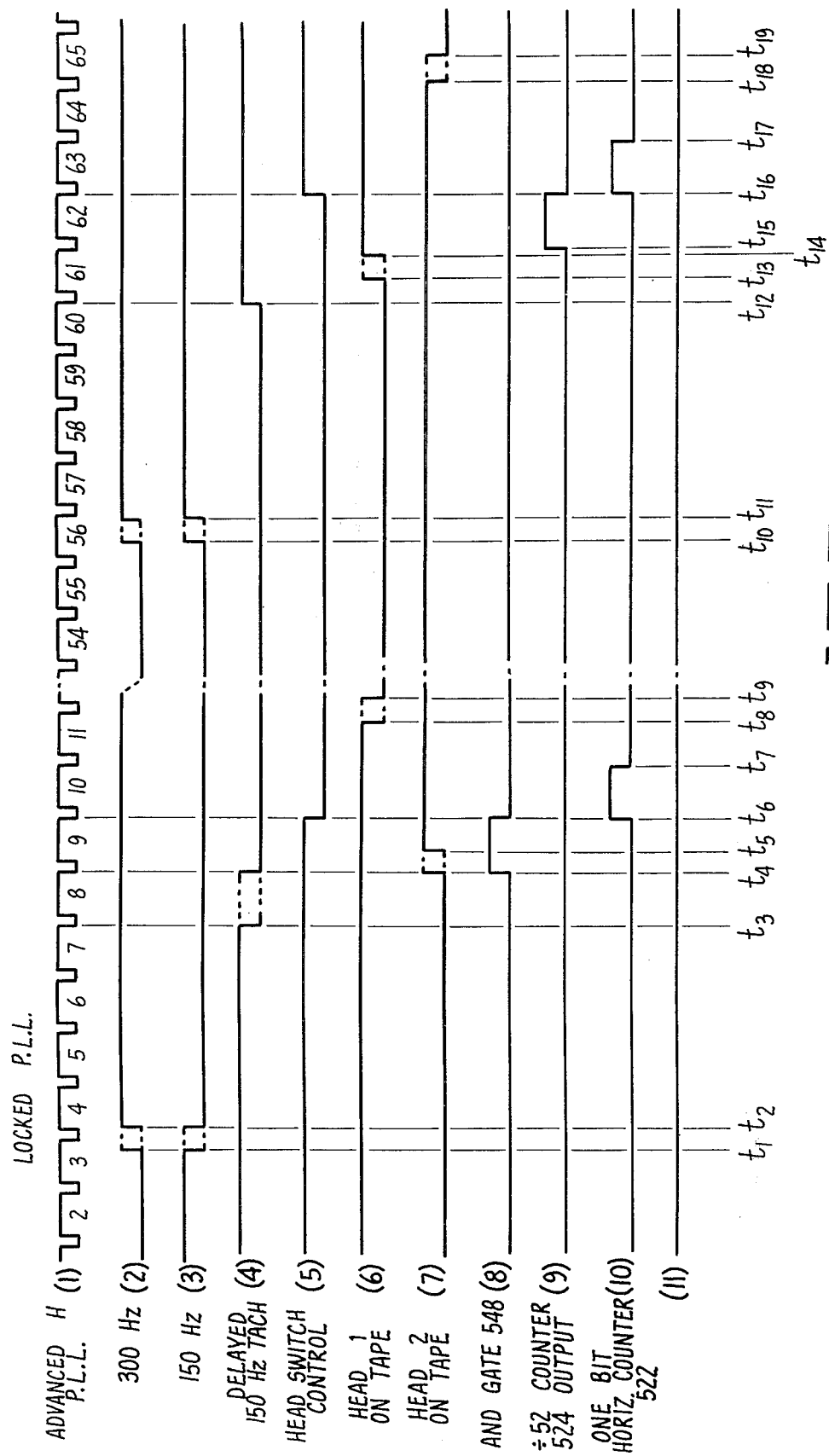

FIGS. 19A and 19B show timing waveforms for a phase locked NTSC VTR associated with the logic circuits FIGS. 14 and 16.

In FIG. 19A, the first head switch occurs at $t_8$ resulting from the delayed 150Hz tach plus 2H and from the one bit counter (latch 522). The next consecutive head switch occurs at $t_{17}$, resulting from both the tach signals and from the one bit delayed output from the AND-gate 548.

In FIG. 19B, the first head switch at $t_6$ occurs earlier than the tach switch would occur as a result of the one bit delayed AND-gate 548 signal. The next consecutive head switch occurs at $t_{16}$ as a result of the tach signals and the one bit delayed output of counter 524'.

Figure 20:
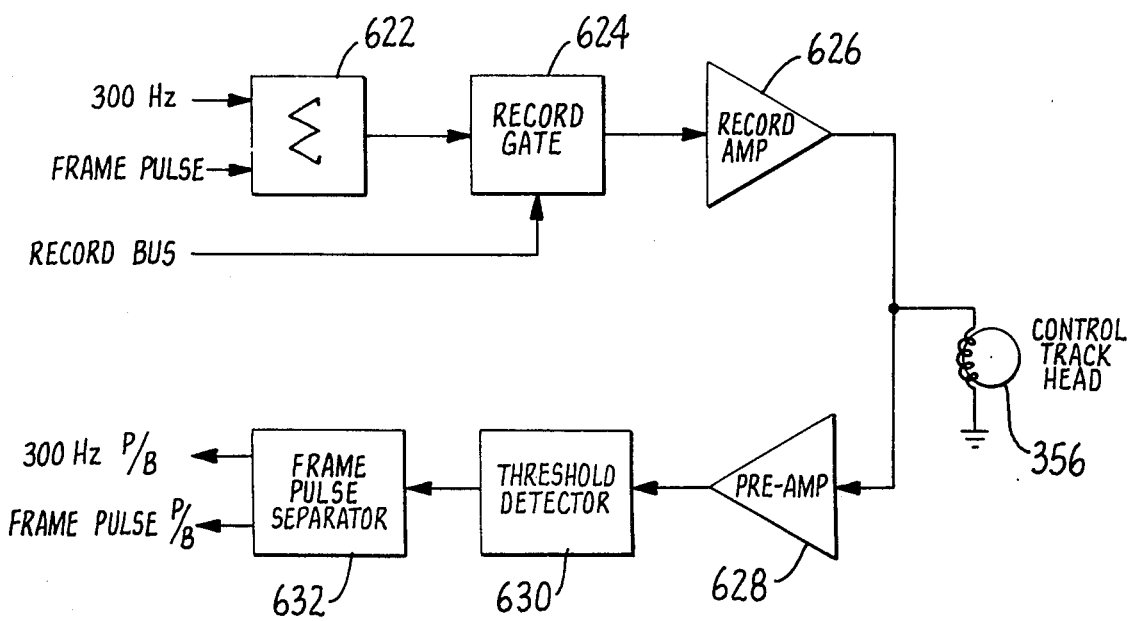
FIG. 20 is a block diagram of the control track and playback circuitry.

Referring now to FIG. 20 a block diagram of the control track record and playback circuitry is shown. A summing circuit 622 receives the 300Hz tach signals (FIG. 17C) and the frame pulse signals (FIG. 17A), combines them and applies them to a record gate 624 controlled by the record bus line. When gated on, gate 624 applies the tach and frame signals to a record amp 626 which is connected to the control track head 356. The signals are saturation recorded by head 358 onto the tape. For playback, the control track head 356 is connected to a preamplifier 628 which drives a threshold detector 630. When the signal exceeds a threshold level, indicating the presence of a control track signal, the detector applies the signal to a frame pulse indicator 632 which provides the 300Hz tach signals and frame pulses on separate lines.

Figure 21:
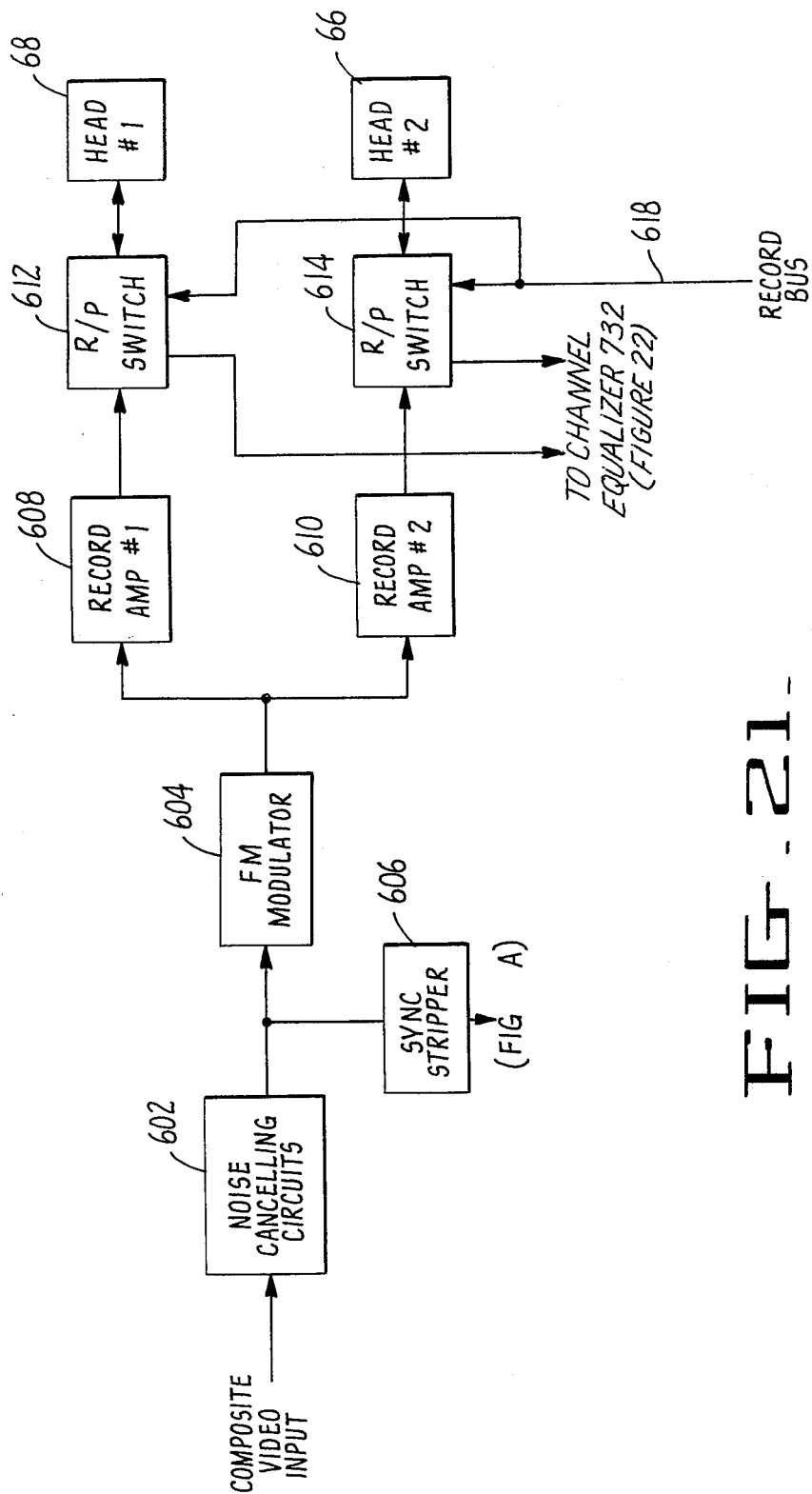
FIG. 21 shows a block diagram of the record portion of a VTR signal system suitable for use with the apparatus of FIGS. 1-10, 14A, 15, 16, 17A and 17C.

A block diagram of the record portion of the signal system of a VTR embodying the present invention is shown in FIG. 21. A composite video input signal is applied to conventional noise cancelling circuits 602 that prepare the signal for an FM modulator 604. Alternately, a pulse-interval-modulator (PIM) may be used. In the 625 line/50Hz PAL/SECAM version, the 0–6MHz baseband signal modulates a double-sideband FM carrier having a deviation from about 9 to 12MHz. A sync stripper 606 provides horizontal and vertical sync pulses to the circuit of FIG. 17A.

A demodulator particularly adapted for use in this environment is disclosed in said copending application of Bert H. Dann entitled FM PULSE AVERAGING DEMODULATOR, U.S. Ser. No. 285,924, filed Sept. 1, 1972.

The modulator 604 output is simultaneously applied to a record amplifier No. 1 (608) and a record amplifier No. 2 (610). First and second record/playback switches 612 and 614 either connect head No. 1 (68) to the record amp 608 or the channel equalizer 732 (FIG. 22) and either connect head No. 2 (66) to record amp 610 or to the channel equalizer 732. Record bus line 618 controls switches 612 and 614.

Figure 22:
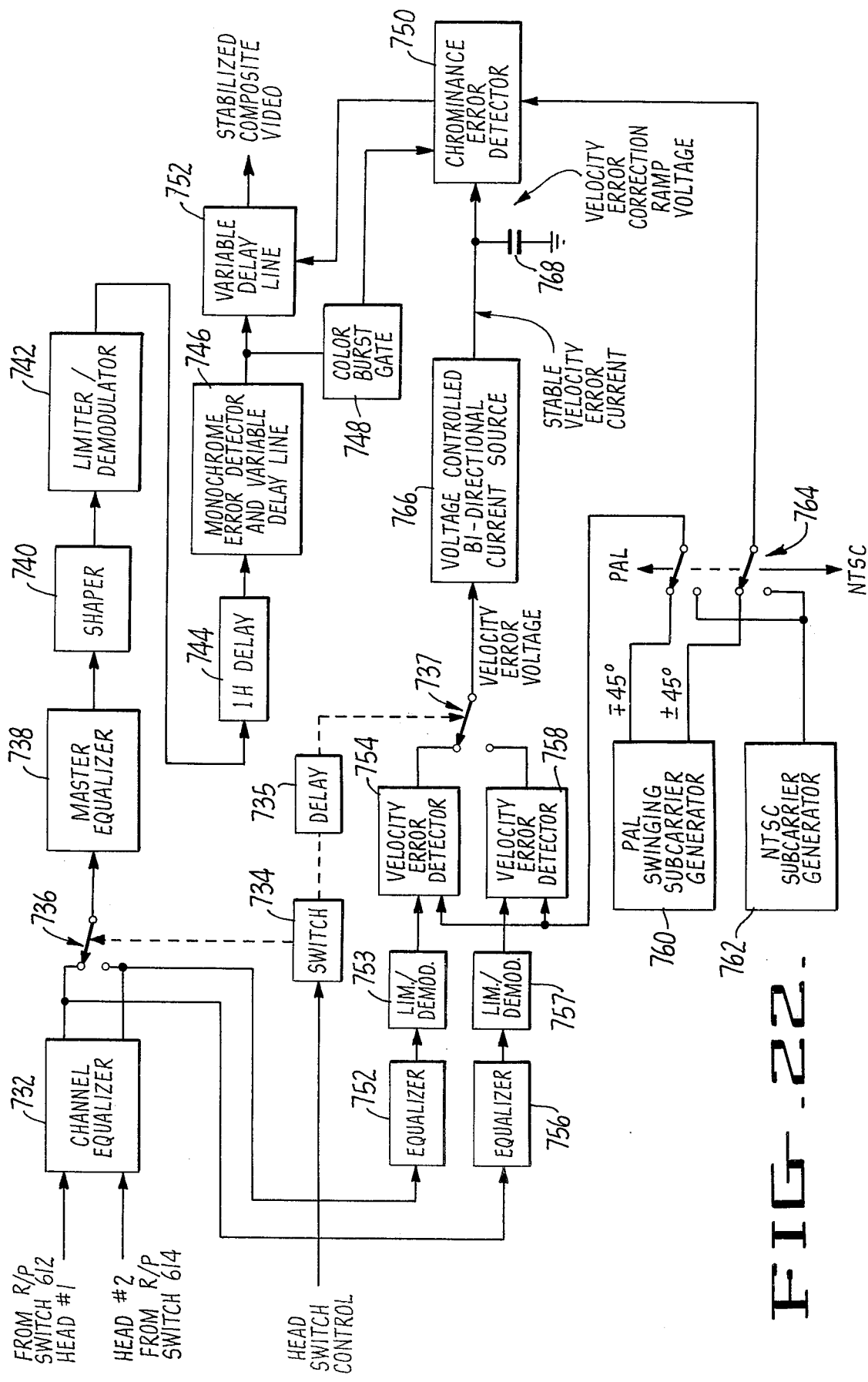
FIG. 22 is related to FIG. 21 and shows a block diagram of the playback portion of a VTR signal system embodying the present invention.

FIG. 22 shows the playback portion of the signal system of a VTR embodying the present invention. The waveform and timing diagram is useful in understanding FIG. 22. In the playback mode, the conventional channel equalizer 732 receives the outputs of head No. 1 and head No. 2 via R/P switches 612 and 614, respectively. Channel equalizer 732 functions to equalize the amplitude of the RF from each of the heads so as to provide a close match and applies the equalized signals to switch 736 and to equalizers 752 and 756. Switch 736 is under the control of the head switch logic of FIGS. 14–16.

Figure 23:
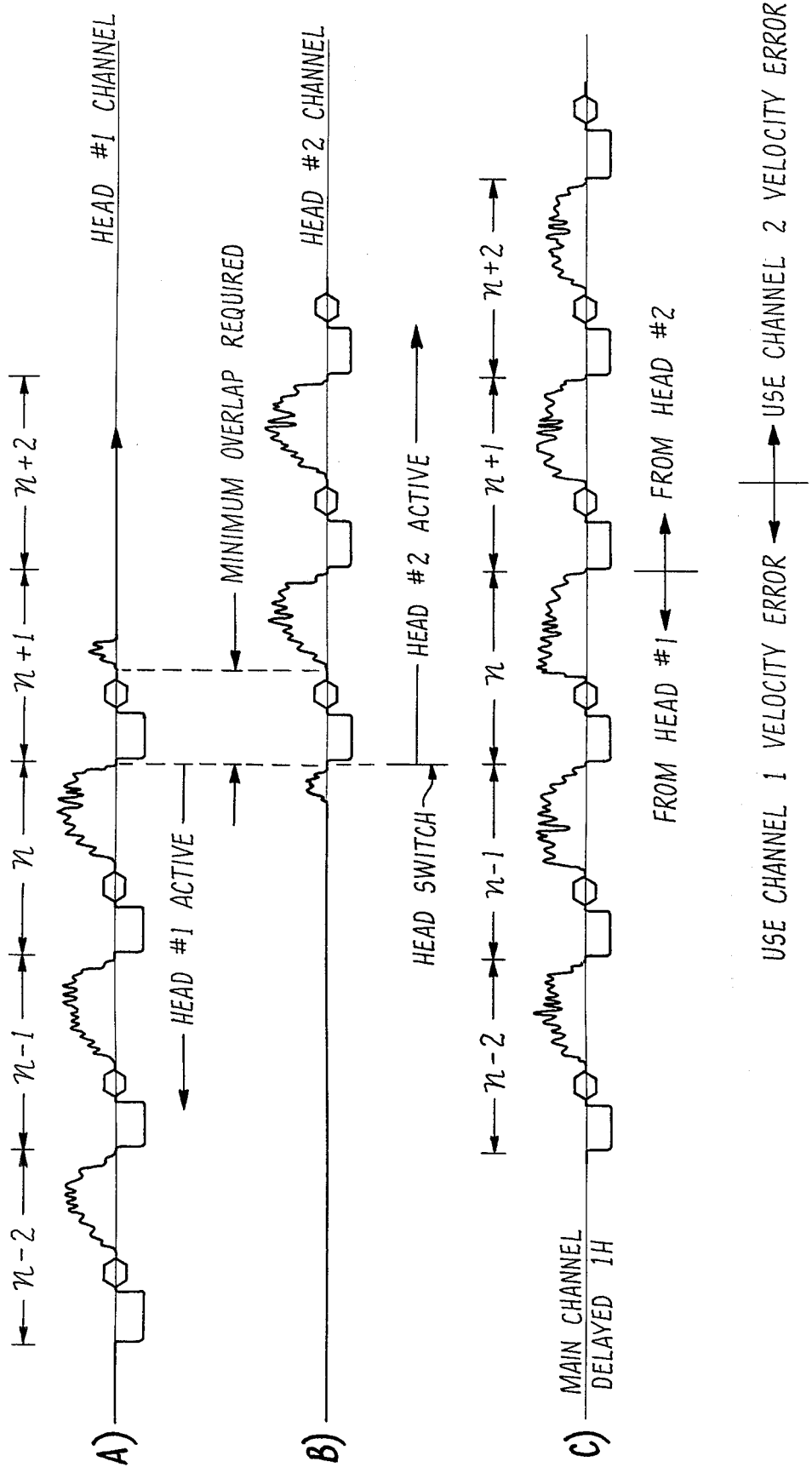
FIG. 23 is a waveform and timing diagram pertaining to FIG. 22 useful in understanding the present invention.

Referring briefly to FIG. 23A and B, the composite video content of the RF signals from heads No. 1 and No. 2 are shown at a time centered around a head switch. That is, head No. 1 is leaving contact with the tape and during video line n+1 ceases to provide any output. Head No. 2 is beginning contact with the tape and during video line n begins to provide output. Under the control of the head switch logic of FIGS. 14–16, the head switch occurs near the middle of the front porch of the horizontal sync pulse beginning line n+1 (see FIG. 17B). Thus the signal applied to master equalizer 738 is a continuous RF signal, which when subsequently delayed one horizontal line (1H), as explained below, has the composite video content as shown in FIG. 23(C). It will be noted that there is a period of overlap when both heads No. 1 and No. 2 are providing a signal. For the purposes of this invention, it is sufficient that both channels produce a relatively noise-free color burst (FIG. 23 shows the burst envelopes for simplicity). If velocity error detectors operating on comparisons of horizontal sync pulses are employed, which alternative is contemplated by the present invention, then an overlap of two relatively noise-free horizontal sync pulses only is required.

A study of FIGS. 23A–C shows why no velocity compensation in a line adjacent a head switch is provided in prior art systems. Prior art velocity error detectors operate off the continuous main channel such as shown in FIG. 23C. Since such detectors typically operate by comparisons of horizontal sync or color bursts on a line by line basis from the same head, the line adjacent a head switch stands by itself. For example, in a playback system having a one line delay in the main signal path, the error detection is made on the main channel before the 1H delay (i.e., FIG. 23C shifted one line to the left). The error correction can then be applied to the delayed main channel. But note that the sync pulses and bursts for lines n and n+1 would not come from the same head, hence line n, which is the line before the head switch, would not be corrected in the prior art system.

Referring again to FIG. 22, the output of master equalizer 738 is applied to a conventional shaper 740. The signal, which is typically a frequency modulation of pulse-interval modulation signal, is applied to a limiter/demodulator 742. One preferred form of such a demodulator is disclosed in said copending application of Bert H. Dann, Ser. No. 285,924, filed Sept. 1, 1972. The demodulate signal, which is unstabilized at this point, is applied to a one horizontal line delay (hereinafter referred to as a "1H delay") 744. The composite video signal can be according to any of the following world color television standards: NTSC, PAL, and PAL-M. The invention is equally applicable to all such systems. The 1H delay 744 need not be a precision delay line, for example, a delay of one horizontal line time plus or minus 0.5 microseconds is suitable. A delay line of this type is relatively inexpensive compared to precision delay lines or complex arrangements for continually recalibrating a delay line.

The equalizers 752 and 756 form the inputs of two channels for processing signals from the respective heads No. 1 and No. 2. It will be appreciated that the invention is applicable to all VTR's using two or more heads having the required overlap of reproduced information by providing a channel for each head. Equalizers 752 and 756 may be relatively low quality equalizers in comparison to master equalizer 138 and need not be matched because it is only the error detected within each channel that is of concern. The equalizer 756 and 756 outputs are applied to limiter/demodulators 753 and 757, which can be of low fidelity. It is only required that a relatively noise-free color burst and horizontal sync signals be applied to the velocity error detectors 754 and 758.

For the purposes of a complete disclosure the details of preferred velocity error detectors are described below. However, other types of detectors may be used within the teachings of this invention. The differential phase and differential gain of the channels is of no concern. Blocks 754 and 758 also receive a reference subcarrier input from switch 764. The invention is not limited to the use of a continuous reference subcarrier. A gated reference subcarrier can be used provided that the reference subcarrier is present during the required sampling intervals, as will be understood.

Figure 24:
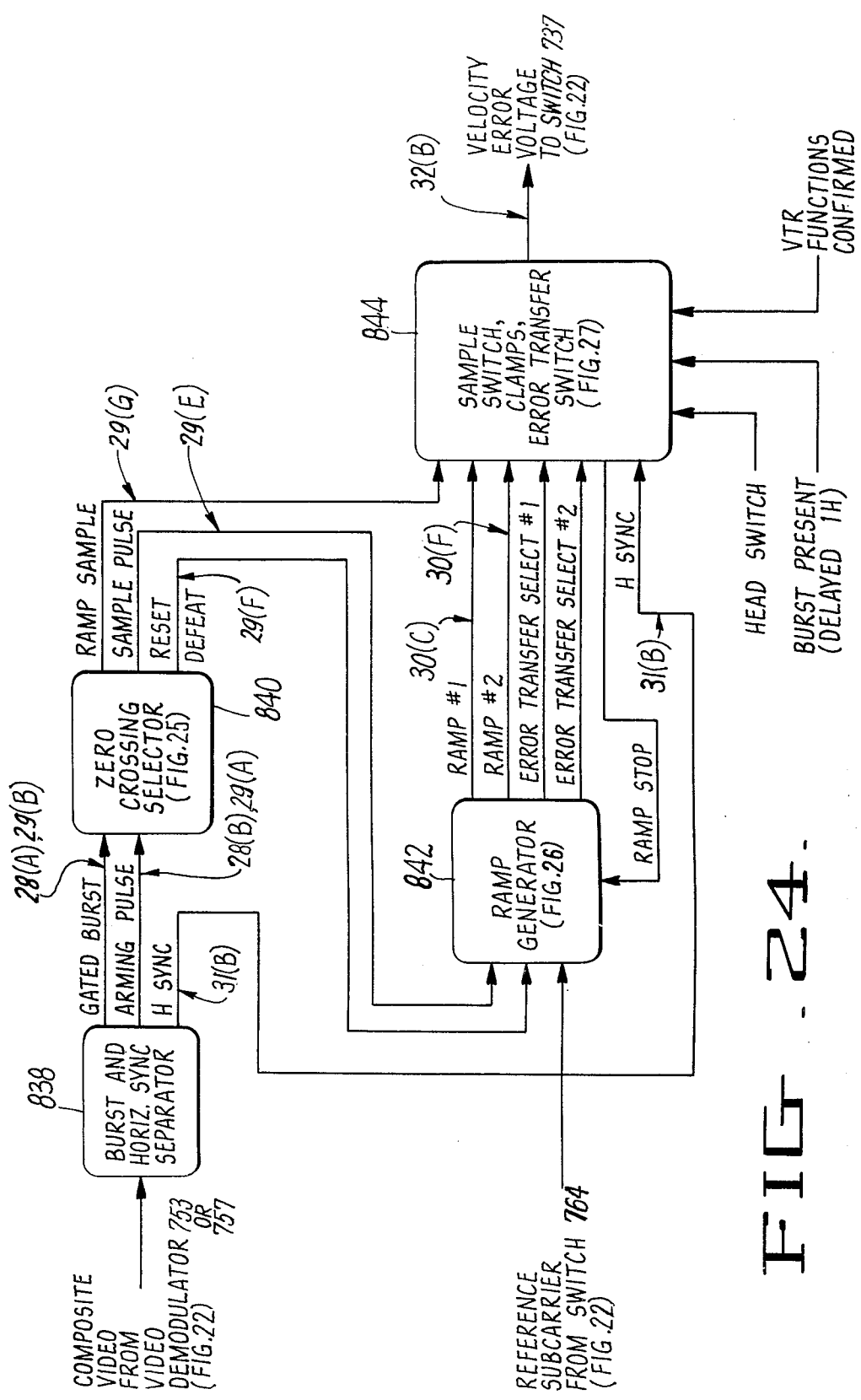
FIG. 24 is a block diagram showing the velocity error detectors of FIG. 22 in greater detail.

The velocity error detectors 754 and 758, shown in greater detail in FIG. 24, receive the raw, uncorrected composite video signal from limiter/demodulators 753 and 757. The composite video signal is uncorrected and contains all time base and velocity errors inherent in the particular VTR. For purposes of illustration, a PAL swinging subcarrier generator 760 is shown having ∓45° and ±45° outputs. As is well known the swinging burst phase alternates from line to line in PAL (or PAL-M), hence when processing PAL (or PAL-M) signals, switch 764 is thrown to apply the ∓45° phase to detectors 754 and 758, which operates prior to 1H delay 744, and the ±45° phase to the chrominance error detector 750, described below, which operates after the 1H delay. When processing NTSC signals, switch 764 is thrown to apply the NTSC subcarrier to detectors 754 and 758. It will be apparent that a particular VTR will likely have either NTSC or PAL (or PAL-M) facilities and not both. Detectors 754 and 758 provides a DC output voltage which is updated during the burst time of each horizontal line when the head connected to that detector is reproducing a signal. The DC voltage output corresponds to the difference in phase error between the selected off-tape color burst zero crossing in consecutive horizontal lines, and the reference color subcarrier which is a direct indication of the "velocity" error along that horizontal television line.

That velocity error voltage relates to the real time off-tape horizontal line that just ended, hence, the 1H delay 744 is used to delay the composite color video signal so that the measured error for that line is actually used to correct the same line.

The 1H delay 744 output is applied first to a conventional monochrome error detector and variable delay line 746. Such devices are well known in the art and are sometimes referred to as a coarse time base error corrector. Ordinarily such units compare off-tape horizontal (in this case, delayed 1H) to reference horizontal and use the detected phase difference to electronically control a delay line in the composite signal path. The output signal from block 746 is thus stabilized sufficiently to provide an acceptable monochrome signal. It should be noted that this correction assures that the beginning of each horizontal line is nearly in phase with the reference horizontal and thus does not provide correction for progressive phase error through the horizontal line which is provided by "velocity" compensation.

The output of block 20 is applied to the chrominance or vernier time base error corrector comprising a variable delay line 752, a color burst gate 748 and a chrominance error detector 750. Detector 750 compares the phase of the off-tape chrominance subcarrier to a reference chrominance subcarrier from generators 760 ar 762 via switch 764 and provides an error signal to adjust delay line 752 to correct any remaining phase error at the beginning of the horizontal line.

The properly selected velocity error measurement from detectors 754 or 758 is an indication of the phase error at the end of the horizontal line. The phase error at the beginning of the horizontal line is corrected by the monochrome and chrominance error detectors and delay lines. Thus, as is well known in the art, the velocity compensating signal is properly a linear ramp beginning at zero at the start of the horizontal line and reaching the measured error at the end of the line. A preferred embodiment to implement this approach in the present invention is to apply the selected DC velocity error voltage from detectors 754 or 758 to a voltage controlled bi-directional current source 766, which is described in greater detail in said application of Barrett E. Guisinger and Bert H. Dann, U.S. Ser. No. 355,220, filed Apr. 27, 1973. Current source 766 generates a highly stable current having a polarity and amplitude controlled by the DC input voltage. The stable output current from cource 766 charges a capacitor 768. The resulting ramp voltage on the capacitor shown in FIG. 32(C) is added to the chrominance phase error voltage for control of delay line 752. In order to provide an accurate velocity error voltage ramp on the capacitor 768, it is extremely important that the current from source 766 remain constant in response to a given DC input voltage in order that the ramp voltage is accurate. Relatively small deviations and perturbations in the ramp voltage can result in erroneous phase corrections by delay line 752.

As noted above the outputs of detectors 754 and 758 must be properly selected by switch 737. In other words, the time for switching from one detector to another must occur in some relation to the head switch time but taking care that the newly selected detector has a valid output signal. Since the detectors require two samples in consecutive lines based on the horizontal sync pulses or color bursts, then the switching time should occur after the second sample is made. Referring again to FIGS. 23A-C, the head No. 2 channel velocity error detector 754 does not have a valid output until the horizontal sync pulse or color burst for line $n+2$ has occurred. For line $n+1$, the other detector 757, for head No. 1, has a valid output. The samples of the pulses or bursts for lines $n+1$ and $n+2$ provide the velocity error for line $n+1$, which is directly applied to correct the 1H delayed line $n+1$ in the main channel. Thus switch 737 should switch from detector 758 to 754 at 1H plus the time of the horizontal sync pulse and color burst (about $10\mu$seconds). A delay 735 thus delays the head switch control signal to operate switch 737. Those of ordinary skill in the art will appreciate that this switching time may occur at a different time relative to the head switch in systems not using a one line delay in the main channel.

Referring now to FIG. 24, which shows in a more detailed block diagram form the velocity error detectors of blocks 754 and 758 in FIG. 22. Only one of the detectors will be described, it being understood that the other is identical. The composite video signal from the video limiter/demodulators 753 or 757 is applied to a burst and horizontal sync separator 838, which is of conventional design. Separator 838 provides a gated burst pulse shown in FIGS. 28(A) and 29(B), arming pulses shown in FIGS. 28(B) and 29(A), and horizontal sync pulses shown in FIG. 31(B). As best seen in FIGS. 28(A) and 28(B), the arming pulse leading edge occurs toward the end of the color burst envelope and the trailing edge falls after the end of the color burst envelope. Prior art devices for providing a gated burst signal and horizontal sync signals from a composite video signal are well known. The arming signal may be simply derived from the burst gate circuitry by means of a delay or monostable multivibrator, for example. As will be explained further below, the leading edge of the arming pulse is closely related to the selection of an off-tape zero crossing of the color burst. It is desirable to select a zero crossing toward the end of the color burst envelope in order to assure that a relatively noise-free zero crossing is available. In typical devices for providing a gated burst a narrow band filter is used such that the burst envelope does not attain its maximum amplitude until toward the end of the burst. Also, one is assured that most transients in the burst gating circuitry have subsided by the end of the burst. The arming pulse and the burst zero crossings are non-synchronous.

Figure 25:
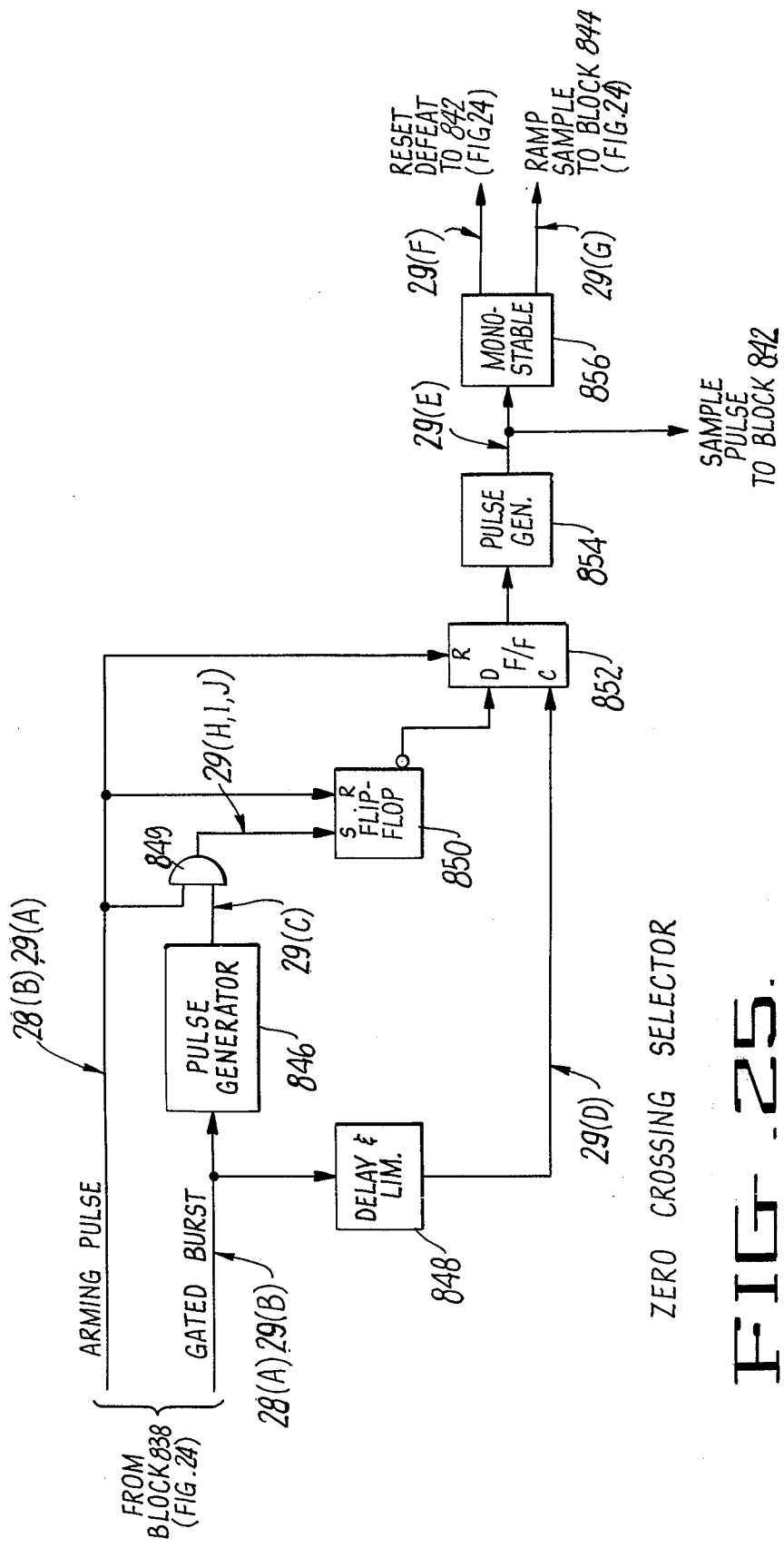
FIG. 25 is a block diagram showing the zero crossing selector of FIG. 24 in greater detail.

The gated bursts and arming pulses are applied to a zero crossing selector 840, which is shown in greater detail in FIG. 25. The zero crossing selector provides for the selection of the next zero crossing of the color burst following the occurrence of the arming signal. The selector 840 includes anti-race circuitry to prevent a race condition when a zero crossing and the arming signal occur closely in time. Selector 840 generates a ramp sample pulse, shown in FIG. 29(G), for sampling a ramp generated from the reference subcarrier as will be explained further below. A narrower sample pulse coincident with the leading edge of the ramp sample pulse and shown in FIG. 29(E) and a reset defeat pulse shown in FIG. 29(F) are applied to ramp generator 842. The ramp generator also receives the reference subcarrier input from switch 764 and a ramp stop signal from block 844 that will be described further below. Ramp generator 842, which is shown in greater detail in FIG. 26, generates first and second ramps, shown in FIGS. 30(C) and 30(F) that are 180° out of phase with each other. Each ramp consists of a retrace portion comprising 90° of the reference subcarrier and a linear ramp portion which comprises 270° of the reference subcarrier. These ramps are applied to block 844 which includes a sample switch, a clamp and an error transfer switch. Block 844 is shown in greater detail in FIG. 27.

Block 842 also applies error transfer select signals No. 1 and No. 2 to block 844 for selection of a valid error signal as will be explained further below. The ramp sample pulse from zero crossing selector 840 is also applied to block 844 and through a buffer as a ramp stop signal to the ramp generator 842 so that the ramps are stopped when sampling takes place. The horizontal sync pulses from block 838 are also applied to block 844. Block 844 also receives certain other signals including the head switching signals, pulses indicating the presence of each color burst (delayed one horizontal line) and signals confirming the operation of certain VTR functions. The head switching signals are derived from other circuitry such as that described in said copending application of Barrett E. Guisinger, U.S. Ser. No. 285,922, filed Sept. 1, 1972. The output of block 844 is the velocity error voltage, shown in FIG. 32(B), which is applied to switch 737 (FIG. 22).

Referring now to FIG. 25 wherein the details of the zero crossing selector 840 of FIG. 24 are shown. FIGS. 28 and 29 depict waveforms that are useful in understanding the operation of the zero crossing selector. The time scale of FIG. 29 is greatly expanded in comparison to that of FIG. 28. For example, in FIG. 28(A) one burst envelope is shown having a length of 2.4 to 2.8 microseconds and containing in the order of 8 to about 11 or 12 cycles. Whereas, in FIG. 29(B) one burst cycle is shown.

The gated burst signals (FIGS. 28(A), 29(B)) are applied to a pulse generator 846 which generates a short pulse, for example, 40 nanoseconds, at each zero crossing of the burst. These pulses shown in FIG. 29(C) are applied to one input of AND-gate 849. The gated burst signals are also applied to a delay and limiter 848. The delay period is chosen to be about half the length of the pulses from generator 846 or about 20 nanoseconds in this example. The delayed and limited (thus becoming a square wave) burst cycles, shown in FIG.

29(D), are applied to the clock input of a flip-flop 852 which operates in the manner that when the data input goes low the next time the clock input goes low it is clocked out. The arming pulse is applied to the other input of AND-gate 849 and to the reset input of flip-flops 850 and 852. The output of AND-gate 849 is applied to the set input of flip-flop 850. The not output of flip-flop 850 is applied to the data input of flip-flop 852. The output of flip-flop 852 is applied to a pulse generator 854 which generates a sample pulse of a 10 nanosecond width, for example, which occurs, with one qualification, at the first negative going zero crossing of the delayed burst subsequent to the arming signal leading edge, as shown in FIG. 29(E). Although the circuit is shown operating on the negative going zero crossing, the positive going zero crossing could be used (but not both). The sample pulse is applied to block 842 and to a monostable multivibrator 856, which generates two longer pulses having their leading edges coincident with the leading edge of the sample pulse. Each of these pulses is 100 nanoseconds, for example, and comprises a positive going reset defeat pulse, shown in FIG. 29(F) and applied to block 842 and a negative going ramp sample pulse, shown in FIG. 29(G) and applied to block 844.

Considering now the operation of FIG. 25, the arming pulse (FIG. 29(A)) may occur at any time relative to a zero crossing of the burst (FIG. 29(B)). The arming pulse sets flip-flop 850 unless it falls within the 40 ns. pulse of generator 846 (FIG. 29(C)), in which case it is set following the 40 ns. pulse time. If flip-flop 850 is set then the next negative going zero crossing of the delayed burst generates the sample pulse (FIG. 29(E)). Thus, a race condition which might occur when the arming pulse and burst zero crossing are nearly the same in time is avoided. FIGS. 29(H–J) show the respective set pulses (outputs of AND-gate 849) for arming pulses (FIG. 29(A)) at $t_{m-1}$, $t_m$ and $t_m+_1$.

Referring now to FIG. 26 wherein the ramp generator 842 of FIG. 24 is shown in greater detail. The waveforms of FIG. 30 are particularly useful in the understanding of the operation of FIG. 26. The reference subcarrier from switch 836 is applied to a phase splitter and limiter 874 which generates first and second window pulses as shown in FIGS. 30(G) and 30(H) 180° out of phase with each other. Each cycle of the window pulses are 360° of the reference subcarrier. The reference subcarrier is also applied through a delay 858 to a further phase splitter and limiter 860. The delay is approximately 225° of the reference subcarrier and its purpose is to center the window pulses on the linear portions of the ramps to be generated from the two phases of the limited subcarrier provided by block 860, shown in FIGS. 30(A) and 30(D). The two phases of the limited reference subcarrier are applied to respective pulse generators 862 and 868 which generate pulses at each zero crossing as shown in FIGS. 30(B) and 30(E). These pulses function to reset ramp generators 864 and 870. The reset pulses thus initiate the retrace period of ramps 1 and 2 shown in FIGS. 30(C) and 30(F). The ramp generators also receive the reset defeat pulse from block 840 of FIG. 24 to prevent resetting of a ramp in the event that a sample is being taken toward the end of a ramp. It will be apparent that in the case where a ramp is reset that the next consecutive ramp is not generated. However, this has no effect on the operation of the system because the next sample is not taken until the next consecutive horizontal line has been completed.

It will be observed from FIG. 30 that the positive going portions of the window No. 1 pulses of FIG. 30(G) "window" the central 180° of the linear portion of ramp No. 1 shown in FIG. 39(C). There is thus an additional 45° of ramp available on either side of the window. In a similar manner window No. 2 pulses of FIG. 30(H) "window" the central linear portion of ramp No. 2 shown in FIG. 30(F).

The sample pulses from block 840 of FIG. 24 are applied to first and second AND-gates 876 which receive, respectively, the two trains of window pulses. Assume, consecutive sample pulses on consecutive lines as shown in FIGS. 30(I) through 30(L). The sample pulse n occurs when the window No. 1 pulse is high and thus RS flip-flop 880, which receives the output of AND-gates 876 and 878 at its set and reset inputs, respectively, will be set and thus the Q output will be high. As will be explained below, this applies the error transfer select No. 1 signal to block 844. Sample pulse n+1 (FIG. 30(J)) occurs at the transition of window No. 1 and window No. 2. Thus, a race condition exists at flip-flop 880. However, as will be understood, it does not matter if the flip-flop is set or reset. Sample pulse n+2 (FIG. 30(K)) occurs during window No. 2 and thus the $\overline{Q}$ output of flip-flop 80 is high providing an error transfer select No. 2 signal to block 844. The use of the error transfer select signals will be explained below. Sample pulse n+3 (FIG. 30(L)) also occurs during window No. 2 and causes the $\overline{Q}$ output of flip-flop 880 to be high. It will be noted that sample pulses n, n+1, and n+2 all occur during the linear portions of both ramps. Whereas, sample pulse n+3 occurs during the retrace portion of ramp No. 1. Circuitry in block 844 to be described below provides the difference of each successive sample on each ramp. Thus, all but the difference of the samples for sample pulse n+3 on ramp No. 1 will be valid. However, as will be understood, by the use of the error transfer select signals only valid sample data are selected. FIG. 30 will be referred to further in the detailed discussion of block 844 in FIG. 27.

It is to be understood that sample pulses n, n+1, n+2 and n+3 of FIG. 30(I-L) occur in consecutive horizontal lines and thus sample corresponding subcarrier ramps (FIGS. 30(C) and 30(F) each displaced in time by approximately one horizontal line. Only one set of subcarrier ramps are shown for the purposes of clarity.

Ramp generators 64 and 70 are conventional circuits driven by current sources 66 and 72. During each ramp sample time (see FIGS. 8(G) and FIG. 3) the ramps are stopped by inactivating the current sources 866 and 872. This is a conventional technique used in ramp sampling circuits in order that the ramp does not change values during a sample.

Figure 27:
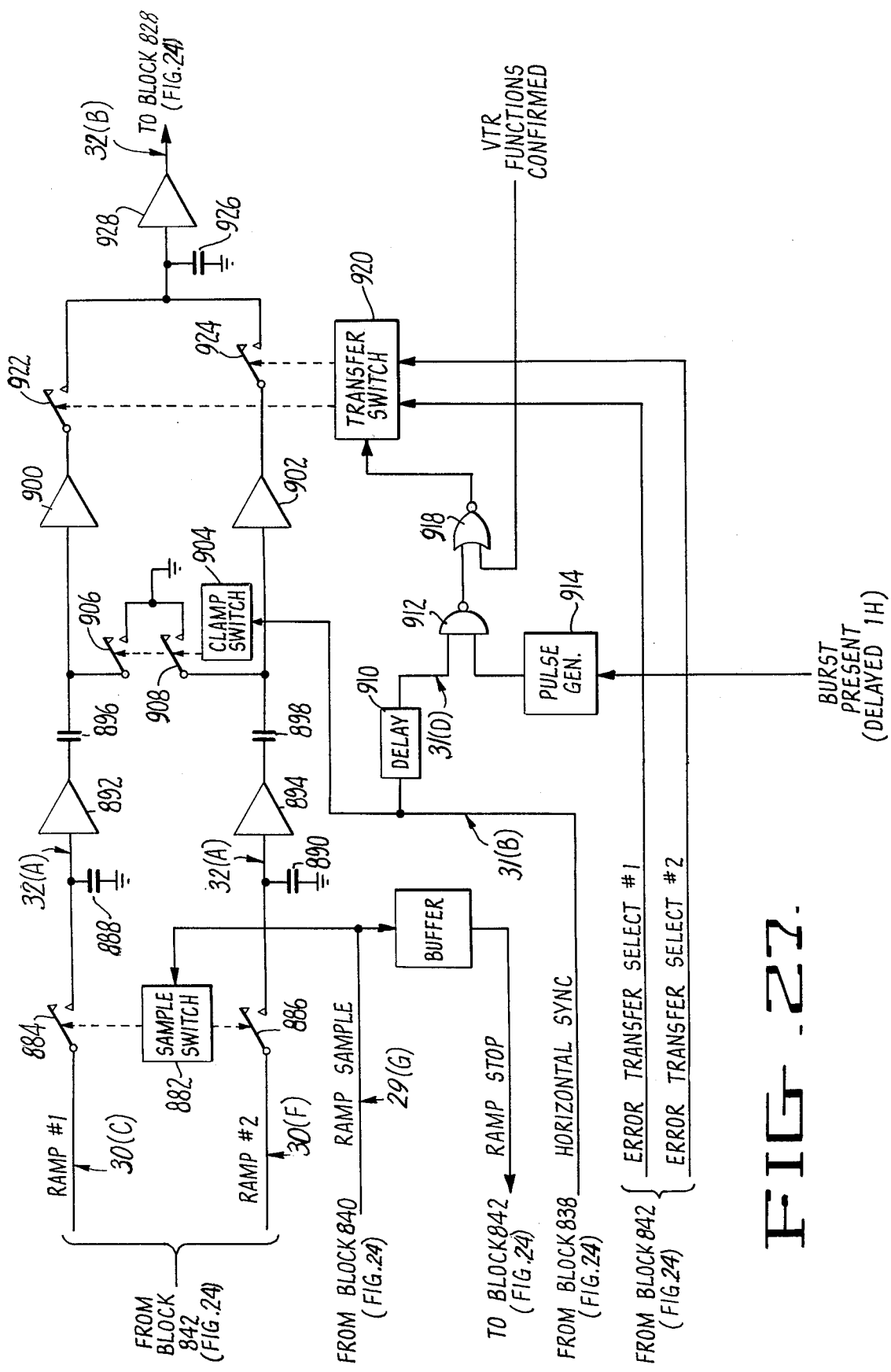
FIG. 27 is a block diagram showing the sample switch, clamps and error transfer switch of FIG. 24 in greater detail.

Referring now to FIG. 27 of the drawings wherein the block 844 of FIG. 24 is shown in greater detail. Reference will also be made to the waveforms of FIG. 31 and again to those of FIG. 30. The first and second ramps of FIGS. 30(C) and 30(F) are applied to respective switches 884 and 886 that are closed upon receipt of a ramp sample pulse (FIG. 29(G)) at block 882. The ramp sample pulse applied to block 882 is also applied to a buffer 930 from which it is routed as the ramp stop pulse having the same duration as the ramp sample pulse to the ramp generator (FIG. 26). When the sample switches 884 and 886 are closed the voltage level of each respective ramp waveform is applied to capacitors 888 and 890, respectively. An exemplary voltage waveform on either of the two capacitors is shown in FIG. 32(A). It will be appreciated that the voltage levels on each capacitor will not have the same absolute magnitude because the ramps are 180° out of phase with each other. A new sample is taken every horizontal line during the burst period. Unit gain buffer amplifiers 892 and 894 apply the voltage on capacitors 888 and 890 to series capacitors 896 and 898, respectively. A pair of switches 906 and 908 which connect capacitors 896 and 898 to ground when clamp switch block 904 receives a horizontal sync pulse (FIG. 31(B)) as a clamp signal. Further unit gain amplifiers 900 and 902 are connected between the other side of switches 906 and 908 and the transfer switches described below. Referring to FIG. 31(A) and (B), the horizontal sync pulse which acts as a clamp signal occurs prior to the burst envelope and thus prior to the sample. When switches 906 and 908 are closed a subtraction takes place and the voltage present at the switch side of the capacitors 896 and 898 is the difference between successive voltage samples on capacitors 888 and 890, respectively. Thus the waveform at the output of amplifiers 900 or 902 is similar to that of FIG. 32(B). While it is convenient to use the horizontal sync signal as a clamp since it is available in the VTR readily, other means for providing a clamping signal could be used.

The horizontal sync clamping signal is also applied to a delay 910 which can be a monostable multivibrator, for example, to provide a delay such as shown in FIG. 31(C) for providing a delayed transfer pulse as shown in FIG. 31(D). Subject to certain other logic functions this transfer pulse operates transfer switch 920 when an error transfer select No. 1 or No. 2 pulse is present in order to close switch 922 or 924 and thus apply the difference signal from the output of amplifier 900 or 902 to capacitor 926 where it is stored from line to line and applied to unitary gain buffer amplifier 928 to provide the velocity error detector output to block 828 of FIG. 24. The output of amplifier 928 is shown in FIG. 32(B). That velocity error voltage of FIG. 32(B) is applied to the voltage controlled bi-directional current source 766 of FIG. 22 to provide the ramp voltages at capacitor 768 of FIG. 22. These ramp voltages which are then applied to the chrominance error detector 750 of FIG. 22 are shown in FIG. 32(C).

Transfer switch 920 selects the difference voltage from either amplifier 900 or amplifier 902 depending on which voltage reflects valid data as determined by the error transfer select signals 1 or 2. Unless one of the two channels contains a difference signal based on the retrace portion of one of the ramp waveforms then both of the channels will contain the same information since the slopes of ramp No. 1 and ramp No. 2 are intended to be as identical as possible. The window logic arrangement described in FIG. 26 assures that the transfer switch will select the channel containing valid data for use as the velocity error voltage.

In a typical practical VTR there are further qualifications on the updating of the voltage on capacitor 926 and thus certain logic functions are connected between the delay 910 and transfer switch 920. Delay 910 is connected as one input to NAND gate 912. The NAND gate 912 also receives the output of a further pulse generator 914 that receives a pulse when each one line delayed burst occurs. Such pulses are available in the typical VTR from conventional drop out correction circuitry. Pulse generator 914 generates pulses of approximately 65 microsecond length, which is about the length of one horizontal line and applies them to NAND gate 912. Thus, in the absence of bursts the voltage on capacitor 926 is not updated. Obviously, if no new bursts are present the information at amplifiers 900 and 902 may be erroneous. The output of NAND gate 912 is applied to a NOR gate 918 which also receives and input which may be designated "VTR functions confirmed" which is normally low if the VTR is operating normally. For example, this input could monitor the locking of the servo loops in the VTR and confirmation that the VTR is in its play mode and that a color recording is being played. The output of NOR gate 918 is applied to the transfer switch 920. Thus, if the VTR is operating normally the output of delay 910 is normally applied to transfer switch 920.

It will be appreciated that it is not critical that that same off-tape burst zero crossing be used for sampling the reference burst at each line. It is not critical because essentially the same sample of each ramp will occur for consecutive zero crossings of the same burst.

It will also be appreciated that although various switches are shown in the drawings and described in the specification in a general block and schematic form that suitable high speed switching means such as solid state devices will be used in practice.

Those of ordinary skill in the art will also appreciate that other means may be provided for the generation of the ramps and windows as shown in FIG. 30(C), 30(F), 30(G) and 30(H). For example, multiplication of the referenced subcarrier and division of the multiplied subcarrier could be used to generate the desired waveforms. Furthermore, it is not absolutely essential that the windows of FIGS. 30(G) and 30(H) be precisely centered on the linear portion of the ramp waveforms 30(C) and 30(F). So long as there is enough of the linear portion of the ramp available on each end to account for the maximum velocity error. In general, each ramp, when two ramps are used, should be longer than 180° of the subcarrier by a time equal to twice the maximum velocity error expected to be encountered in one horizontal line of the VTR. Obviously, more than two ramps could be used. For example, instead of using two ramps 180° out of phase with respect to each other, three ramps could be used spaced at 120° with appropriate windows. This would necessitate a third channel in the circuitry of FIG. 27, however, and would likely not be desirable from a cost standpoint. Moreover, other variations of periodic waveforms and "window" or gating pulses will be apparent to those of ordinary skill in the art. The phase or time comparison arrangement being a type of four quadrant phase detector with means for avoiding ambiguity. Such variations on the disclosed embodiments are intended to be within the scope of the present invention.

The embodiment of FIG. 22 may also utilize a velocity error detector comparing off-tape horizontal sync to reference sync such as disclosed in said copending application of Barrett E. Guisinger and Bert H. Dann, U.S. Ser. No. 355,220, filed Apr. 27 1973. Other prior art velocity error detectors may, likewise, be used within the scope of the present invention.

Moreover, the invention is not limited to use in VTRs having a one line delay in the signal path. For example, the present invention is equally applicable to storage type velocity compensators.

Those of ordinary skill in the art will appreciate that the invention disclosed herein can be modified and is therefore not limited to the precise embodiments disclosed. The invention is therefore to be limited only by the scope of the appended claims.

We claim:

1. In a video tape recorder adapted for reproducing a recorded composite color video signal, said video tape recorder including a rotating head assembly having a plurality of video heads, adjacent heads reproducing at least a one horizontal sync pulse overlap of composite video information, said recorder reproducing an uncorrected composite color video signal having line-to-line velocity errors and time base errors, the combination comprising error detector means continuously receiving the outputs of all said video heads for generating a plurality of error signals, one error signal for each video head corresponding to changes in phase of said uncorrected reproduced video signal from each video head in succeeding horizontal video lines, means receiving said error signals for selecting one of said error signals as the error signal output, and means receiving said error signal output for generating a ramp signal output proportional to said error signal.

2. The combination of claim 1 wherein said error detector means further receives a reference signal for comparing the phase of said uncorrected reproduced video signal to said reference signal in succeeding horizontal video lines.

3. The combiantion of claim 2 wherein said reference signal comprises horizontal sync pulses and wherein said horizontal sync pulses are compared in phase to the horizontal sync pulses of the reproduced video signals.

4. The combination of claim 1 in a video tape recorder where said adjacent heads reproduce at least one horizontal sync pulse and color burst overlap of composite video information and wherein said error detector means further receives a reference signal for comparing the phase of said uncorrected reproduced video signal to said reference signal in succeeding horizontal video lines.

5. The combination of claim 4 wherein said reference signal comprises a color subcarrier signal and wherein said color subcarrier signal is compared in phase to the color bursts of the reproduced video signals.

6. The combination of claim 1 in a video tape recorder where said video tape recorder includes a time base error corrector system of a type including an electronically variable delay line adapted for insertion in the reproduced composite color video signal path for varying the phase of the video signal in accordance with an error signal applied to the control input, the combination further comprising means receiving the output of said video heads for switching video heads to provide a continuous off-tape signal, means receiving said continuous off-tape signal for providing a reproduced composite color video signal, means for delaying by approximately one horizontal line the reproduced composite color video signal applied to said electronically variable delay line, and means for applying said ramp signal output to the control input of said electronically variable delay line.

7. The combination of claim 6 wherein said error detector means further receives a reference signal for comparing the phase of said uncorrected reproduced video signal to said reference signal in succeeding horizontal video lines.

8. The combination of claim 7 wherein said reference signal comprises horizontal sync pulses and wherein said horizontal sync pulses are compared in phase to the horizontal sync pulses of the reproduced video signals.

9. The combination of claim 6 in a video tape recorder where said adjacent heads reproduce at least one horizontal sync pulse and color burst overlap of composite video information and wherein said error detector means further receives a reference signal for comparing the phase of said uncorrected reproduced video signal to said reference signal in succeeding horizontal video lines.

10. The combination of claim 9 wherein said reference signal comprises a color subcarrier signal and wherein said color subcarrier signal is compared in phase to the color bursts of the reproduced video signals.

* * * * *